US012459675B2

(12) United States Patent
Smith et al.

(10) Patent No.: US 12,459,675 B2

(45) Date of Patent: Nov. 4, 2025

(54) MANEUVERING A SPACECRAFT USING AN OPTIMIZED GUIDANCE TRAJECTORY AND MODEL PREDICTIVE CONTROL

(71) Applicant: Space Dynamics Laboratory, North Logan, UT (US)

(72) Inventors: Tyson Smith, Logan, UT (US); John Akagi, Logan, UT (US); Greg Droge, Logan, UT (US)

( * ) Notice: Subject to any disclaimer, the term of this patent is extended or adjusted under 35 U.S.C. 154(b) by 133 days.

(21) Appl. No.: 18/528,385

(22) Filed: Dec. 4, 2023

(65) Prior Publication Data

US 2024/0124162 A1 Apr. 18, 2024

Related U.S. Application Data

(63) Continuation-in-part of application No. 18/465,505, filed on Sep. 12, 2023, now Pat. No. 12,304,664, which is a continuation-in-part of application No. 17/891,968, filed on Aug. 19, 2022, now Pat. No. 12,269,618, which is a continuation-in-part of application No. 17/689,038, filed on Mar. 8, 2022, now Pat. No. 12,129,051.

(51) Int. Cl.

| | |
|---|---|
| ***B64G 1/24*** | (2006.01) |
| ***G06F 30/20*** | (2020.01) |
| ***G06F 111/10*** | (2020.01) |

(52) U.S. Cl.

CPC ............ *B64G 1/244* (2019.05); *G06F 30/20* (2020.01); *G06F 2111/10* (2020.01)

(58) Field of Classification Search

CPC ...... B64G 1/244; B64G 1/242; B64G 1/1085; G06F 30/20; G06F 2111/10

See application file for complete search history.

(56) References Cited

U.S. PATENT DOCUMENTS

| | | | | |
|---|---|---|---|---|
| 2017/0247123 | A1 | 8/2017 | Turner | |
| 2017/0269610 | A1* | 9/2017 | Weiss | B64G 1/244 |
| 2018/0233054 | A1* | 8/2018 | Woon | G08G 5/74 |
| 2019/0049999 | A1* | 2/2019 | Weiss | B64G 1/28 |
| 2020/0055617 | A1* | 2/2020 | Grover | B64G 1/244 |
| 2021/0403182 | A1* | 12/2021 | Weiss | B64G 1/6462 |
| 2022/0063842 | A1* | 3/2022 | Weiss | B64G 1/646 |
| 2022/0363415 | A1 | 11/2022 | Conn | |

OTHER PUBLICATIONS

"Office Action Summary", USPTO, Jul. 25, 2024, pp. 1-48.

(Continued)

*Primary Examiner* — Wade Miles

*Assistant Examiner* — Mohammed Yousef Abuelhawa

(57) ABSTRACT

For maneuvering a spacecraft, a method calculates a virtual point that represents a plurality of spacecraft orbiting in a spacecraft formation. The method iteratively calculates a desired trajectory relative to the virtual point for a given spacecraft of the plurality of spacecraft using a relative orbital elements (ROE) state x of the virtual point and the given spacecraft. Model predictive control maintains the given spacecraft within an ROE constraint for a given time interval subject to a fuel consumption. In response to determining a drift trajectory of the given spacecraft is outside of a trajectory tolerance of the desired trajectory, maneuvering the given spacecraft to within the trajectory tolerance using a maneuver trajectory determined using the model predictive control.

20 Claims, 30 Drawing Sheets

(56) References Cited

OTHER PUBLICATIONS

Augenstein et al., "Optimal Scheduling of a Constellation of Earth-Imaging Satellites, for Maximal Data Throughput and Efficient Human Management", Proceedings of the Twenty-Sixth International Conference on Automated Planning and Scheduling, vol. 26, Association for the Advancement of Artificial Intelligence, 2016, pp. 1-8.
H.Shang et al., "Design and optimization of low-thrust orbital phasing maneuver", Aerospace Science adn Technology No. 42, Feb. 7, 2015, pp. 365-375.
M. Pontani et al., "Nonlinear Earth orbit control using low-thrust propulsion", Acta Astronautica, No. 179, Oct. 21, 2020, pp. 296-310.
"Notice of Allowance and Fees Due", United States Patent and Trademark Office, Aug. 2, 2024, pp. 1-9.
S. Augenstein et al., "Optimal Scheduling of a Constellation of Earth-Imaging Satellites, for Maximal Data Throughput and Efficient Human Management", Proceedings of the Twenty-Sixth International Conference on Automated Planning and Scheduling, vol. 26, Association for the Advancement of Artificial Intelligence, 2016, pp. 1-8.
S. D'Amico, "Autonomous Formation Flying in Low Earth Orbit", Ridderprint BV, Mar. 1, 2010, pp. 1-235.
T.K. Smith et al., "Spacecraft Formation Flying Control Switching Surface Based on Relative Orbital Elements", Aerospace Engineer, Space Dynamics Laboratory, AAS 22-259, Jan. 2022, pp. 1-19.

* cited by examiner

201

| Spacecraft State 203 |
| --- |
| Distance Threshold 205 |
| Outer Polytope Boundary 207 |
| Inner Polytope Boundary 209 |
| Matrix Constraint 211 |
| First Objective Function 213a |
| Second Objective Function 213b |
| Third Objective Function 213c |
| Fourth Objective Function 213d |
| Maneuver Strategy 215 |
| Velocity Change 217 |
| Model Predictive Controller 219 |
| Orbital Data 221 |
| Switching Strategy 223 |

| Drift Horizon 225 |
| --- |
| ROE Data 227 |
| Drift State 241 |
| Controller Weights 243 |
| Guidance Trajectory 245 |
| Desired Trajectory 246 |
| Simulation 247 |
| Control 249 |
| Switching Condition 251 |
| Guidance Law 253 |
| Model Predictive Control 255 |
| Fuel Consumption 257 |
| Control Law 261 |
| Time Interval 263 |

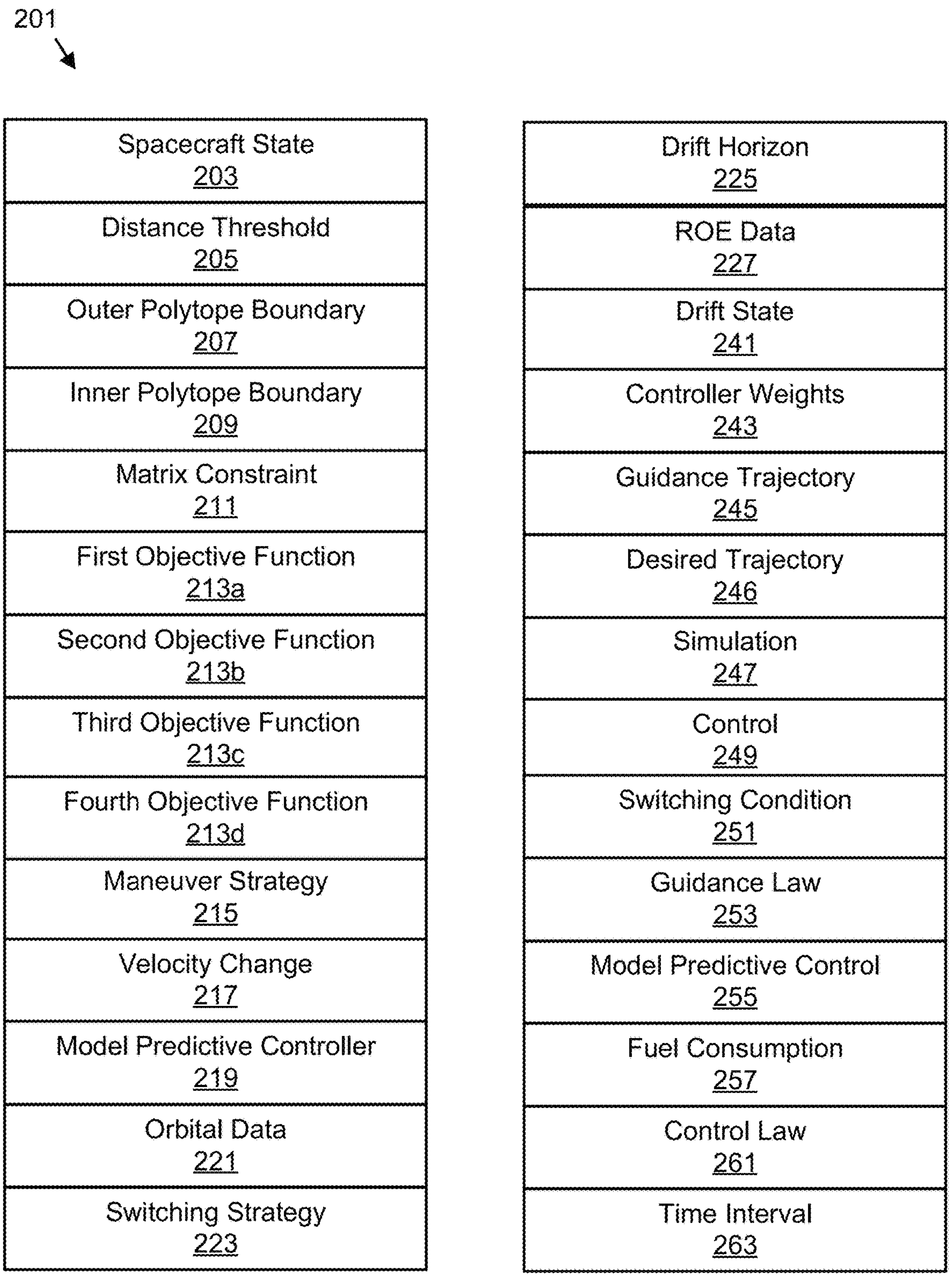

| ROE Maximum Bounds 229 |
| LVLH... |

- ROE Maximum Bounds 229
- ROE Minimum Bounds 231
- ROE State 233
- ROE Constraint 236
- LVLH State 235
- ROE Space 237
- LVLH State Contraints 238
- LVLH Space 239

MANEUVERING A SPACECRAFT USING AN OPTIMIZED GUIDANCE TRAJECTORY AND MODEL PREDICTIVE CONTROL

CROSS-REFERENCE TO RELATED APPLICATIONS

This application is a continuation-in-part of and claims priority to U.S. patent application Ser. No. 18/465,505 entitled "MANEUVERING A SPACECRAFT USING AN OPTIMIZED GUIDANCE TRAJECTORY AND MODEL PREDICTIVE CONTROL" and filed on Sep. 12, 2023 for Tyson Smith, which is incorporated herein by reference and which is a continuation-in-part of and claims priority to U.S. patent application Ser. No. 17/891,968 entitled "MODEL PREDICTIVE CONTROL FOR SPACECRAFT FORMATION" and filed on Aug. 19, 2022, for Tyson Smith, which is incorporated herein by reference, and which claims priority to U.S. patent application Ser. No. 17/689,038 entitled "MODEL PREDICTIVE CONTROL FOR SPACECRAFT FORMATION" and filed on Mar. 8, 2022, for Tyson Smith, which is incorporated herein by reference.

BACKGROUND INFORMATION

The subject matter disclosed herein relates to maneuvering a spacecraft using an optimized guidance trajectory and model predictive control.

BRIEF DESCRIPTION

A method for maneuvering a spacecraft is disclosed. The method calculates a virtual point that represents a plurality of spacecraft orbiting in a spacecraft formation. The method further iteratively calculates a desired trajectory relative to the virtual point for a given spacecraft of the plurality of spacecraft using a relative orbital elements (ROE) state x of the virtual point and the given spacecraft. Model predictive control maintains the given spacecraft within an ROE constraint for a given time interval subject to a fuel consumption. In response to determining a drift trajectory of the given spacecraft is outside of a trajectory tolerance of the desired trajectory, maneuvering the given spacecraft to within the trajectory tolerance using a maneuver trajectory determined using the model predictive control. An apparatus and computer program product for practicing the method are also disclosed.

BRIEF DESCRIPTION OF DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2C is a schematic block diagram illustrating one embodiment of spacecraft data;

DETAILED DESCRIPTION

Figure 1A:
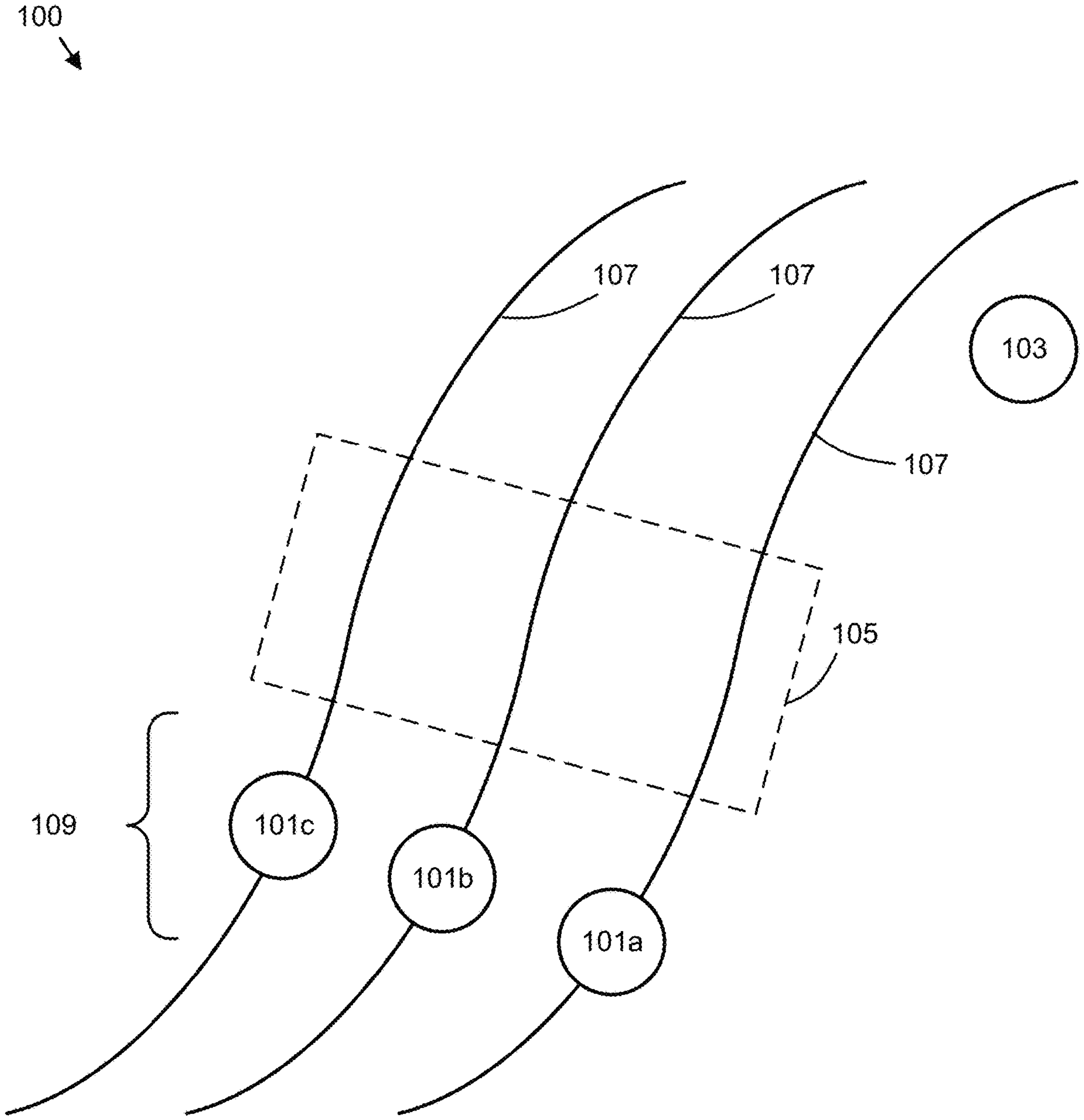
FIG. 1A is a schematic diagram illustrating one embodiment of a spacecraft constellation.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing computer readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in computer readable code and/or software for execution by various types of processors. An identified module of computer readable code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of computer readable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a computer readable signal medium or a computer readable storage medium. The computer readable storage medium may be a storage device storing the computer readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable code embodied therein, for example, in baseband or as part of a carrier wave. Such a propagated signal may take any of a variety of forms, including, but not limited to, electro-magnetic, optical, or any suitable combination thereof. A computer readable signal medium may be any storage device that is not a computer readable storage medium and that can communicate, propagate, or transport a program for use by or in connection with an instruction execution system, apparatus, or device. Computer readable code embodied on a storage device may be transmitted using any appropriate medium, including but not limited to wireless, wire line, optical fiber cable, Radio Frequency (RF), etc. or any suitable combination of the foregoing.

Computer readable code for carrying out operations for embodiments may be written in any combination of one or more programming languages, including an object-oriented programming language such as Python, Ruby, R, Java, Java Script, Smalltalk, C++, C sharp, Lisp, Clojure, PHP, MATLAB, or the like and conventional procedural programming languages, such as the "C" programming language or similar programming languages. The computer readable code may execute entirely on a spacecraft or ground station computer, partly on the spacecraft or ground station computer, as a stand-alone software package, partly on the spacecraft computer and partly on a ground station computer or entirely on the ground station remote computer or server. In the latter scenario, the remote computer may be connected to the spacecraft computer through any type of network.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by computer readable code. These computer readable code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The computer readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable code.

The description of elements in each figure may refer to elements of proceeding figures. Like numbers refer to like elements in all figures, including alternate embodiments of like elements.

FIG. 1A is a schematic diagram illustrating one embodiment of a spacecraft constellation 100. In the depicted embodiment, a plurality of spacecraft 101 are shown traversing orbital tracks 107. The spacecraft 101 may be orbiting in a spacecraft formation 109 to perform a mission objective such as capturing data in a target area 105. Capturing data may include but is not limited to gravitational mapping, capturing images, capturing sensor data, making measurements, communicating with ground stations 103 on the ground, communicating with another spacecraft 101, and the like.

A spacecraft 101 may need to maneuver to remain in the spacecraft formation 109. For example, a mission may require the spacecraft 101 to maintain a separation distance. In addition, the spacecraft 101 may maneuver to avoid debris or perform a mission objective. Maneuvers are complicated by a need to maintain the spacecraft formation 109 and/or separations distances. In addition, maneuvers are constrained by a need to reduce fuel consumption. Unfortunately, both communication bandwidth to the spacecraft 101 and/or on spacecraft computing resources may be limited. As a result, the spacecraft 101 may need to calculate maneuvers with restricted computing resources. In addition, a ground station 103 may need to calculate maneuvers for many spacecraft 101 concurrently.

The embodiments described herein employ model predictive control (MPC) with polytope boundaries to determine and maintain guidance trajectories for a spacecraft formation 109. The embodiments may simplify the calculations so that a spacecraft 101 may perform the calculations autonomously. In addition, the embodiments may speed the calculations for maneuvers at the ground station 103. As a result, the efficiency of a computer controlling the spacecraft 101 is improved.

Figure 1B:
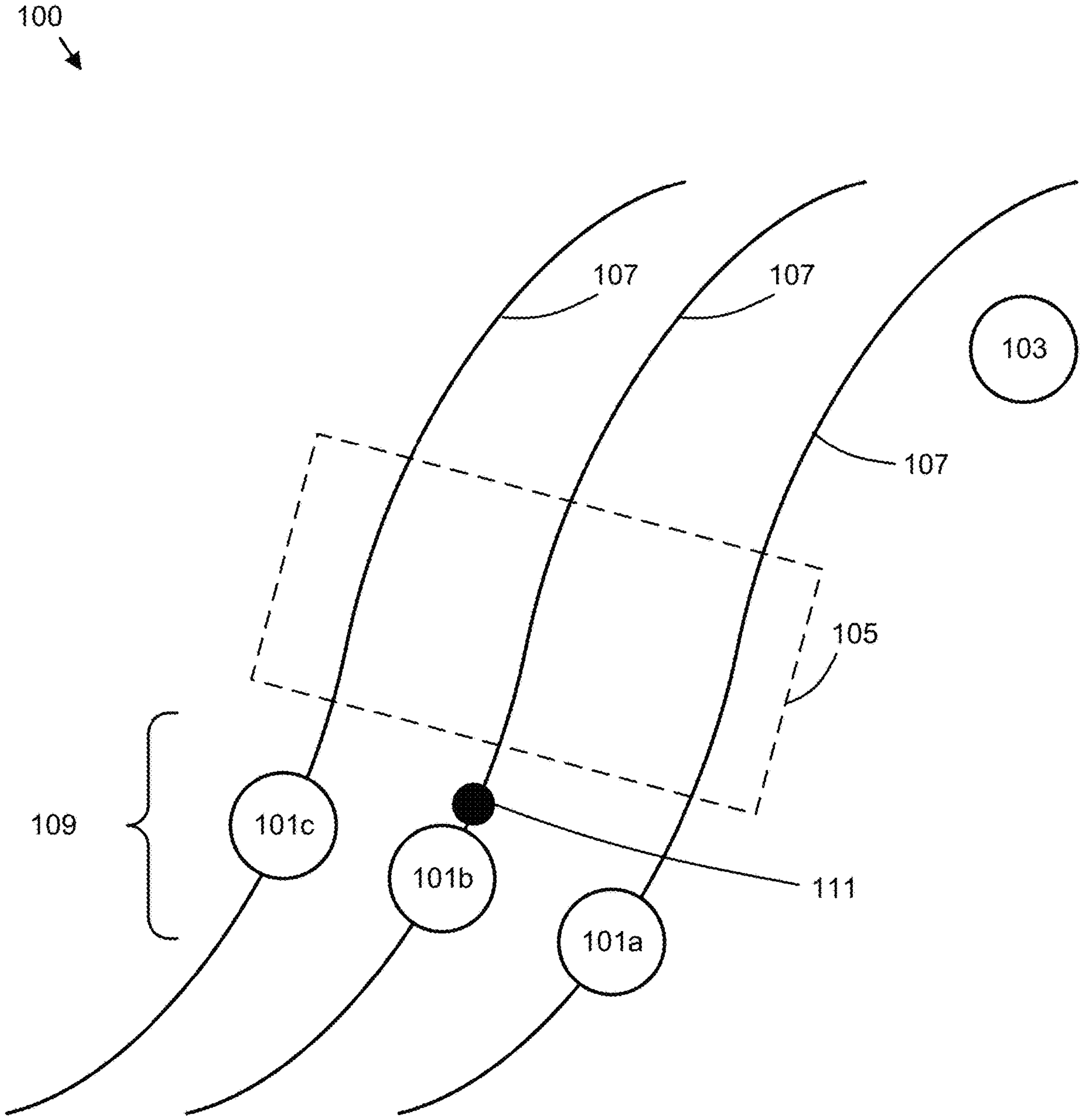
FIG. 1B is a schematic diagram illustrating one alternate embodiment of a spacecraft constellation.

FIG. 1B is a schematic diagram illustrating one alternate embodiment of the spacecraft constellation 100. In the depicted embodiment, a virtual point 111 is shown for the spacecraft formation 109. The virtual point 111 may be used to design a reference orbit for each spacecraft 101 in the spacecraft formation 109. There is no physical spacecraft 101 associated with the virtual point 111. The virtual point 109 represents a fictitious spacecraft 101 where motion is propagated through time according to a standard nonlinear motion model. From the virtual point 111, relative orbital tracks 107 may be generated that define the nominal locations of each of the spacecraft 101 within the spacecraft formation 109. The virtual point 111 may represent the spacecraft formation 109 to each spacecraft 101, simplifying control calculations. In the depicted embodiment, the virtual point 111 leads the spacecraft formation 109.

Figure 1C:
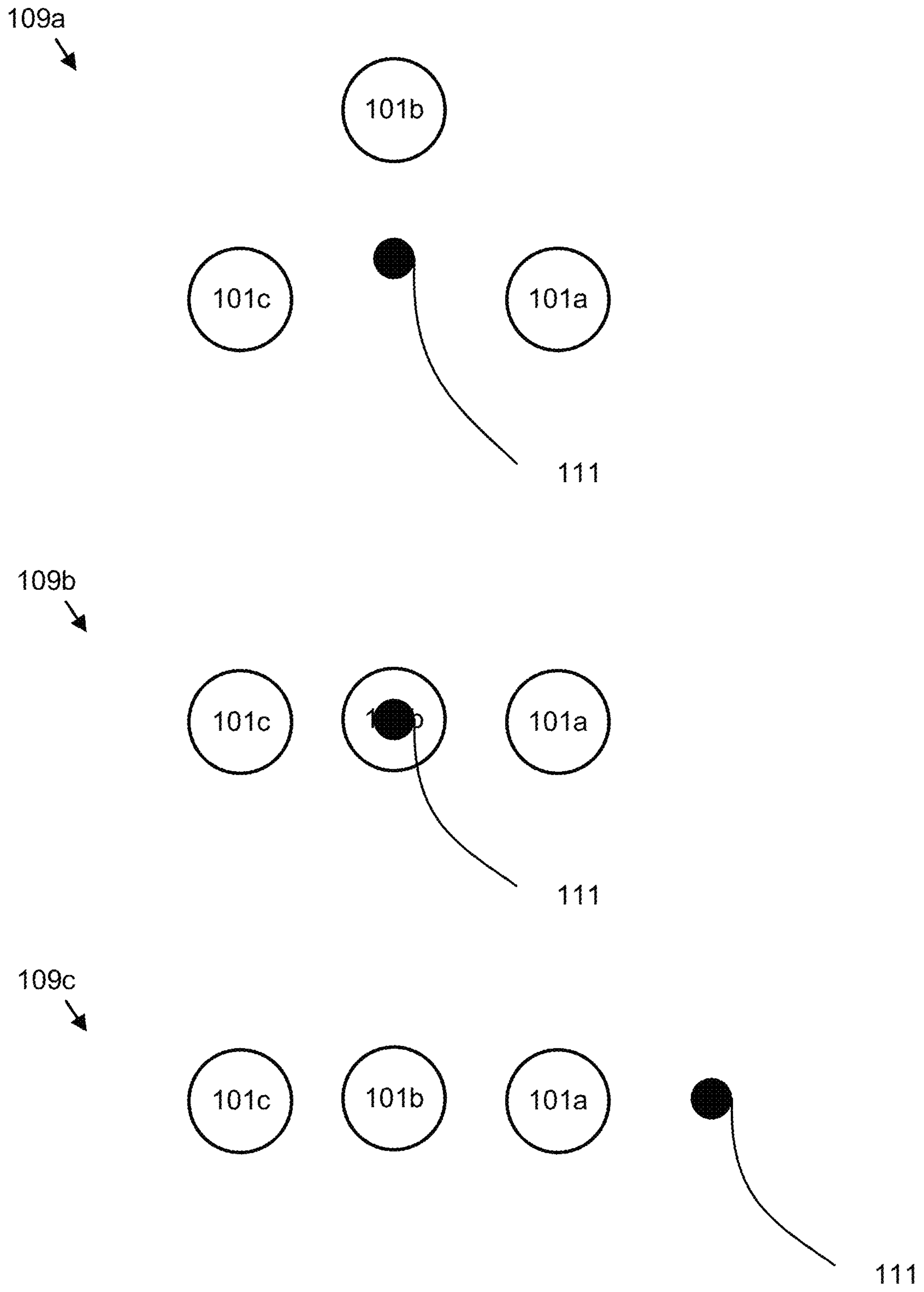
FIG. 1C is a schematic diagram illustrating one embodiment of virtual points.

FIG. 1C is a schematic diagram illustrating one embodiment of virtual points 111 in spacecraft formations 109*a-c*. The virtual point 111 may be at a center of a spacecraft formation 109 as shown for spacecraft formations 109*a/b*. The virtual point 111 may be offset from the center including outside the spacecraft formation 109 as shown in spacecraft formation 109*c*.

Figure 1D:
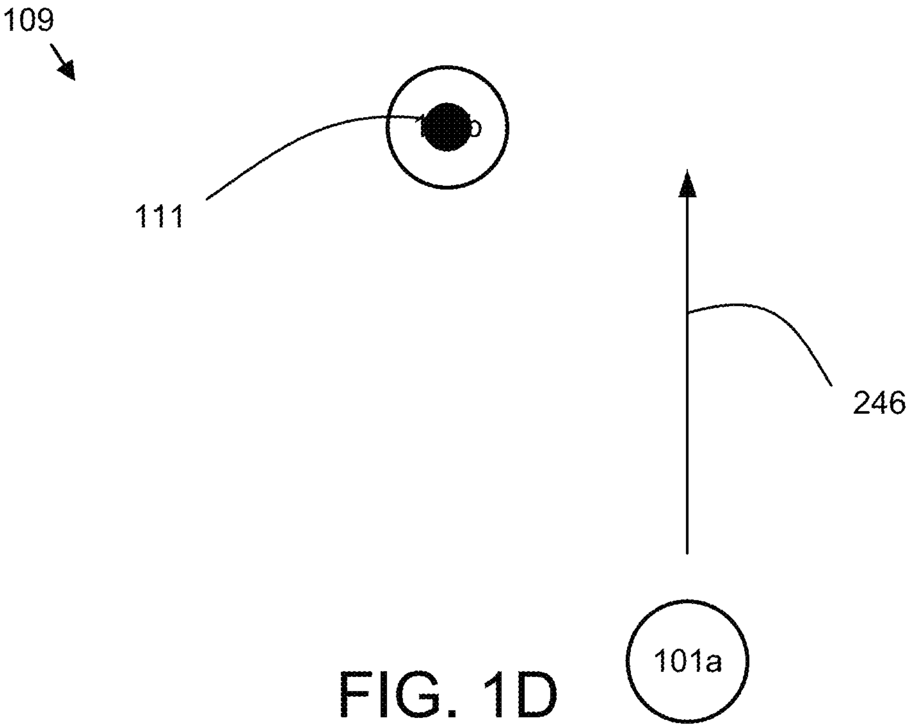
FIG. 1D is a schematic diagram illustrating one embodiment of a desired trajectory.

FIG. 1D is a schematic diagram illustrating one embodiment of a desired trajectory 246 of a spacecraft 101. The desired trajectory 246 may be relative to the virtual point 111. In one embodiment, the desired trajectory 246 is relative to the virtual point 111 at a specified time. The desired trajectory 246 may be relative to a trajectory of the virtual point 111.

Figure 1E:
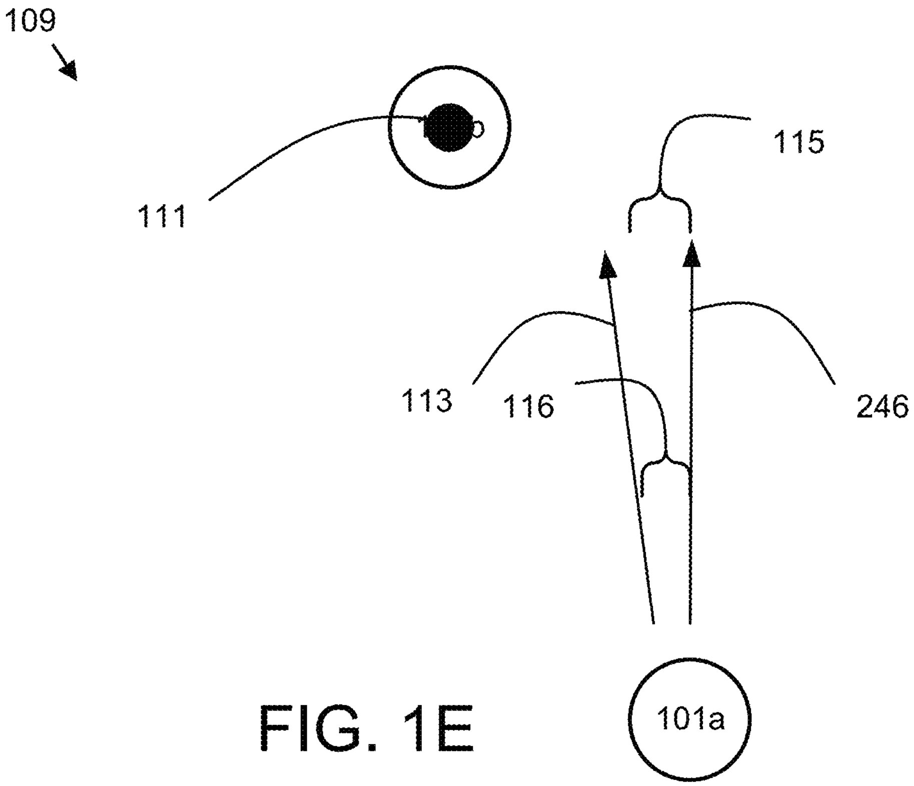
FIG. 1E is a schematic diagram illustrating one embodiment of a drift trajectory and a trajectory tolerance.

FIG. 1E is a schematic diagram illustrating one embodiment of a drift trajectory 113 and a trajectory tolerance 115. The drift trajectory 113 may be a current and/or predicted trajectory of a spacecraft 101. The drift trajectory 113 may be relative to the virtual point 111, the virtual point 111 at a specified time, and/or a trajectory of the virtual point 111. A drift error 116 is the difference between the desired trajectory 246 and the drift trajectory 113. The trajectory tolerance 115 may specify an allowable drift error 116 such as a maximum allowable drift error 116.

Figure 1F:
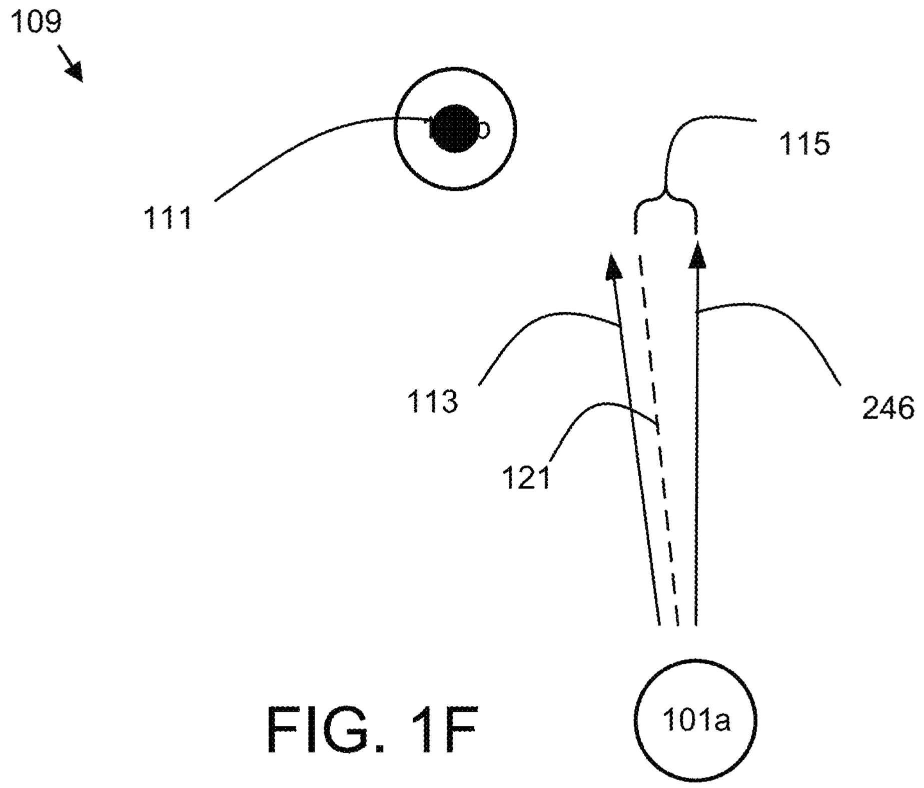
FIG. 1F is a schematic diagram illustrating one embodiment of a switching surface.

FIG. 1F is a schematic diagram illustrating one embodiment of a switching surface 121. In one embodiment, the trajectory tolerance 115 is exceeded if a portion of the drift trajectory 113 is beyond the switching surface 121.

Figure 1G:
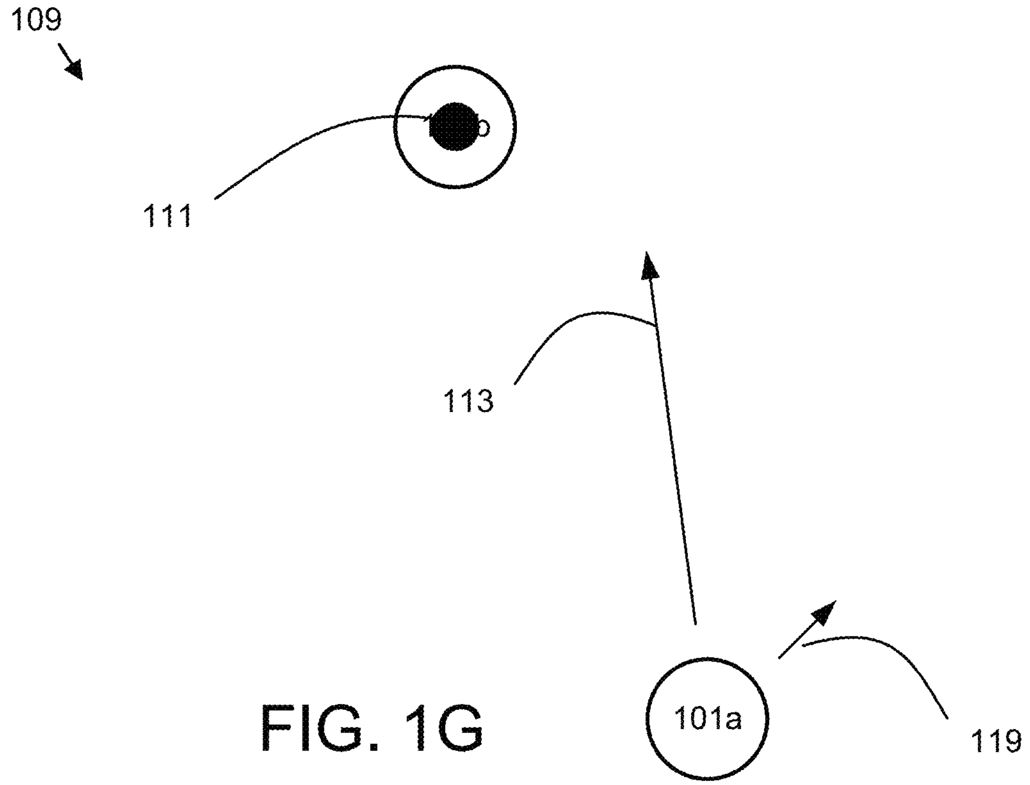
FIG. 1G is a schematic diagram illustrating one embodiment of a maneuver trajectory.

FIG. 1G is a schematic diagram illustrating one embodiment of a maneuver trajectory 119. The maneuver trajectory 119 is applied to the spacecraft 101 to maneuver the spacecraft 101 so that the drift trajectory 113 is with the trajectory tolerance 115 of the desired trajectory 246 as will be described hereafter.

Figure 2A:
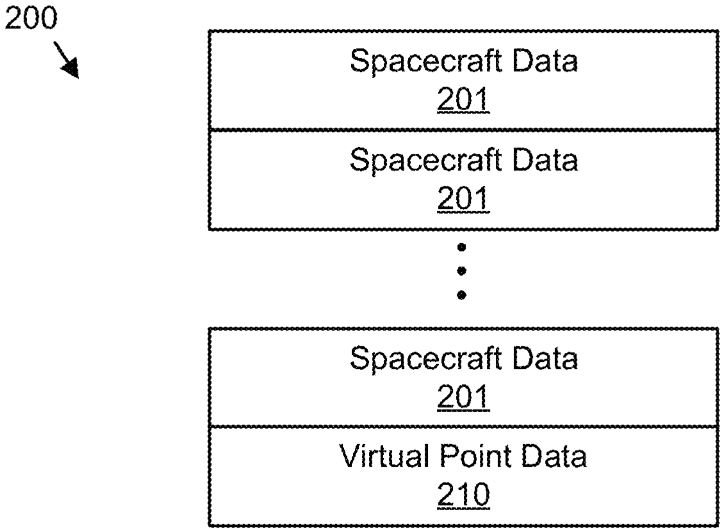
FIG. 2A is a schematic block diagram illustrating one embodiment of formation data.

FIG. 2A is a schematic block diagram illustrating one embodiment of formation data 200. The formation data 200 describes the orbital track 107 of the spacecraft 101 in the spacecraft formation 109. The formation data 200 may be organized as a data structure in a memory. The formation data 200 includes spacecraft data 201 for each spacecraft 101 in the spacecraft formation 109. The spacecraft data 201 is described in more detail in FIG. 2C. In addition, the formation data 200 includes virtual data 210 that describes the orbital track 107 of the virtual point 111.

Figure 2B:
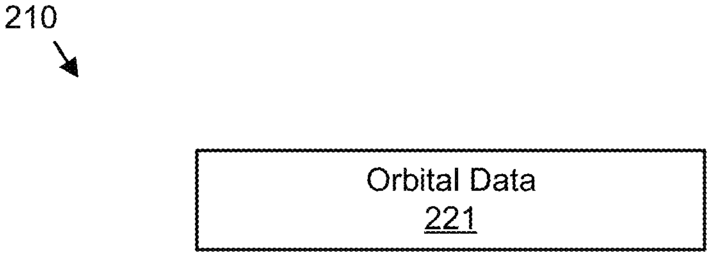
FIG. 2B is a schematic block diagram illustrating one embodiment of virtual point data.

FIG. 2B is a schematic block diagram illustrating one embodiment of the virtual point data 210. In the depicted embodiment, the virtual point data 210 includes orbital data 221. The orbital data 221 may be expressed as Relative Orbital Elements (ROE) and/or Local Vertical Local Horizontal (LVLH) data.

In one embodiment, the orbital data 221 is described using Hill-Clohessey-Whiltshire (HCW) equations as shown in Equation 1. The HCW equations linearize the two-body gravitational dynamic equations about a near circular orbit and can be stated as $$\ddot{x}-3n_c^2x-2n_c\dot{y}=u_x$$

$$\ddot{y}+2n_c\dot{x}=u_y$$

$$\ddot{z}+n_c^2z=u_z \tag{1}$$

where x, y, and z represent the relative position of the spacecraft 101 in Cartesian coordinates in the Local Vertical, Local Horizontal (LVLH) frame; $\dot{x}$, $\dot{y}$, and $\dot{z}$ represent the relative velocities; $\ddot{x}$, $\ddot{y}$, and $\ddot{z}$ represent the relative accelerations; and $n_c$ is the mean motion, or average angular velocity, of the orbital data 221. The LVLH frame may be defined such that x is the radial direction, z is along the angular momentum vector, and y satisfies the right-hand rule.

If the spacecraft state of the virtual point 111 or spacecraft 101 is defined by the spacecraft state comprising a motion vector $x=[x\ y\ z\ \dot{x}\ \dot{y}\ \dot{z}]^T$ and control vector as $u=[u_x u_y u_z]^T$, Equation 1 can be written in the state space form as shown in Equation 2.

$$x = Ax + Bu \tag{2}$$

where $$A = \begin{bmatrix} 0 & 0 & 0 & 1 & 0 & 0 \\ 0 & 0 & 0 & 0 & 1 & 0 \\ 0 & 0 & 0 & 0 & 0 & 1 \\ 3n_c^2 & 0 & 0 & 0 & 2n_c & 0 \\ 0 & 0 & 0 & -2n_c & 0 & 0 \\ 0 & 0 & -n_c^2 & 0 & 0 & 0 \end{bmatrix} B = \begin{bmatrix} 0 & 0 & 0 \\ 0 & 0 & 0 \\ 0 & 0 & 0 \\ 1 & 0 & 0 \\ 0 & 1 & 0 \\ 0 & 0 & 1 \end{bmatrix}. \tag{3}$$

If A and B are held constant over some timestep Δt, an exact discrete solution can be found as shown in Equation 4.

$$x_{k+1}=A_Dx_k+B_Du_k, A_D=e^{A\Delta t}, B_D=\left(\int_0^{\Delta t}e^{A(\Delta t-\tau)}d\tau\right)B \tag{4}$$

The resulting discretized HCW matrices are shown in Equations 5 and 6.

$$A_D = \begin{bmatrix} 4-3\cos n_c\Delta t & 0 & 0 & \frac{1}{n_c}\sin n_c\Delta t & \frac{2}{n}(1-\cos n_c\Delta t) & 0 \\ 6(\sin n_c\Delta t - n_c\Delta t) & 1 & 0 & \frac{2}{n}(\cos n_c\Delta t - 1) & \frac{1}{n_c}(4\sin n_c\Delta t - 3n_c\Delta t) & 0 \\ 0 & 0 & \cos n_c\Delta t & 0 & 0 & \frac{1}{n_c}\sin n_c\Delta t \\ 3n_c\sin n_c\Delta t & 0 & 0 & \cos n_c\Delta t & 2\sin n_c\Delta t & 0 \\ 6n_c(\cos n_c\Delta t - 1) & 0 & 0 & -2\sin n_c\Delta t & 4\cos n_c\Delta t - 3 & 0 \\ 0 & 0 & -n_c\sin n_c\Delta t & 0 & 0 & \cos n_c\Delta t \end{bmatrix} \tag{5}$$

$$B_D = \begin{bmatrix} \frac{2}{n_c^2}\sin^2\frac{n_c\Delta t}{2} & -\frac{2}{n_c^2}(\sin n_c\Delta t - n_c\Delta t) & 0 \\ \frac{2}{n_c^2}(\sin n_c\Delta t - n_c\Delta t) & -\frac{2}{n_c^2}\left(8\cos n_c\Delta t + 3n_c^2\Delta t^2 - 8\right) & 0 \\ 0 & 0 & \frac{2}{n_c^2}\sin^2\frac{n_c\Delta t}{2} \\ \frac{1}{n_c}\sin n_c\Delta t & -\frac{1}{n_c}(2\cos n_c\Delta t - 2) & 0 \\ -\frac{4}{n_c^2}\sin^2\frac{n_c\Delta t}{2} & \frac{4}{n_c}\sin n_c\Delta t - 3\Delta t & 0 \\ 0 & 0 & \frac{1}{n_c}\sin n_c\Delta t \end{bmatrix} \tag{6}$$

In one embodiment, $A_D$ matches the discrete transition matrix in Equation 2 while $B_D$ is derived using Equations 3 and 4. In one embodiment, the orbit δα is defined using orbital elements in Equations 7 and 8, where a is a semi-major axis, e is an eccentricity vector of $e_x$ and $e_y$, i is an inclination vector of $i_x$ and $i_y$, Ω is a right ascension of ascending node, ω is an argument of perigee, a mean argument of latitude f, mean anomaly M, and c and d subscripts indicate the elements of the chief or reference and deputy or spacecraft orbital paths 107. When the eccentricity and inclination vectors e and i are parallel to each other, the spacecraft 101 does not pass through the relative orbital plane in front of the virtual point 111. In contrast, if the inclination vectors e and i are orthogonal, the spacecraft 101 does pass through the orbital plane in the along track direction raising the risk of collision. The ROE state of the spacecraft 101 is nonsingular for circular orbits ($e_c$=0), whereas it is still singular for strictly equatorial orbits ($i_c$=0).

$$\delta\alpha = \begin{bmatrix} \delta a \\ \delta\lambda \\ \delta e_x \\ \delta e_y \\ \delta i_x \\ \delta i_y \end{bmatrix} = \begin{bmatrix} (a_d - a_c)/a_c \\ (f_d - f_c) + (\Omega_d - \Omega)\cos i_c \\ e_{x,d} - e_{x,c} \\ e_{y,d} - e_{y,c} \\ i_d - i_c \\ (\Omega_d - \Omega_c)\sin i_c \end{bmatrix} \tag{7}$$

where $$\begin{bmatrix} a \\ f \\ e_x \\ e_y \\ i \\ \Omega \end{bmatrix} = \begin{bmatrix} a \\ \omega + M \\ e\cos\omega \\ e\sin\omega \\ i \\ \Omega \end{bmatrix} \tag{8}$$

FIG. 2C is a schematic block diagram illustrating one embodiment of the spacecraft data 201. In the depicted embodiment, the spacecraft data 201 includes the spacecraft state 203, a distance threshold 205, an outer polytope boundary 207, an inner polytope boundary 209, a matrix constraint 211, at least one objective function 213, a maneuver strategy 215, a velocity change 217, the MPC 219, the orbital data 221 for the spacecraft 101, a switching strategy 223, a drift horizon 225, ROE data 227, a drift state 241, controller weights 243, a guidance trajectory 245, the desired trajectory 246, a simulation 247, a control 249, a switching condition 251, a guidance law 253, model predictive control 255, fuel consumption 257, a control law 261, and a time interval 263.

The distance threshold 205 may specify a maximum distance that a given spacecraft 101 may move within the spacecraft formation 109 relative to the virtual point 111. The distance threshold 205 may be a constant. Alternatively, the distance threshold 205 may be dynamically calculated. The distance threshold 205 may be a vector. The drift state 241 may characterize drift. The fuel consumption 257 may specify a fuel consumption maximum, a fuel consumption target rate, a fuel consumption limit, a fuel consumption constraint, and/or the like.

The controller weights 243 may include weights for control usage R, state error Q, and terminal error P. Table 1 illustrates exemplary controller weights 243.

TABLE 1

| Norm | Weight | Lower Bound | Upper Bound |
|---|---|---|---|
| $L_1$ | $R_x$ | 0.005 | 0.015 |
| $L_1$ | $R_y$ | 0.005 | 0.015 |
| $L_1$ | $R_z$ | 0.005 | 0.015 |
| $L_1$ | $P_x$ | 5.0 | 15.0 |
| $L_1$ | $P_y$ | 5.0 | 15.0 |
| $L_1$ | $P_z$ | 5.0 | 15.0 |
| $L_1$ | $P_{\dot{x}}$ | 0.5 | 1.5 |
| $L_1$ | $P_{\dot{y}}$ | 0.5 | 1.5 |
| $L_1$ | $P_{\dot{z}}$ | 0.5 | 1.5 |
| $L_2$ | $R_x$ | 0.00005 | 0.00015 |
| $L_2$ | $R_y$ | 0.00005 | 0.00015 |
| $L_2$ | $R_z$ | 0.00005 | 0.00015 |
| $L_2$ | $P_x$ | 5.0 | 15.0 |
| $L_2$ | $P_y$ | 5.0 | 15.0 |
| $L_2$ | $P_z$ | 5.0 | 15.0 |
| $L_2$ | $P_{\dot{x}}$ | 0.05 | 0.15 |
| $L_2$ | $P_{\dot{y}}$ | 0.05 | 0.15 |
| $L_2$ | $P_{\dot{z}}$ | 0.05 | 0.15 |
| $L_\infty$ | $R_x$ | 0.005 | 0.015 |
| $L_\infty$ | $R_y$ | 0.005 | 0.015 |
| $L_\infty$ | $R_z$ | 0.005 | 0.015 |
| $L_\infty$ | $P_x$ | 5.0 | 15.0 |
| $L_\infty$ | $P_y$ | 5.0 | 15.0 |
| $L_\infty$ | $P_z$ | 5.0 | 15.0 |
| $L_\infty$ | $P_{\dot{x}}$ | 0.5 | 1.5 |
| $L_\infty$ | $P_{\dot{y}}$ | 0.5 | 1.5 |
| $L_\infty$ | $P_{\dot{z}}$ | 0.5 | 1.5 |

The MPC 219 may employ model predictive control 255 find the most fuel-efficient strategy to perform an in-space maneuver for the spacecraft 101 to minimize fuel consumption 257 by the spacecraft 101. The basis for these dynamic optimization problems is a dynamic model that describes how the spacecraft state x(k) 203 changes with time, assuming an initial condition x(0), that is affected by the control input u(k) of a control vector u as shown in Equation 9. The control input and/or control vector u may implement a guidance law 253.

$$x(k+1)=g(x(k),u(k)),x(0)=x_0, \tag{9}$$

where g(x, u) generally represents a nonlinear function. The goal of the optimal control procedure is to find the vector of inputs $U_N=[u(0)^T, \ldots, u(N-1)^T]^T$ such that the objective function is optimized over the time horizon N. The MPC 219 may be solved as shown in Equation 10.

$$\min_{U_N} \sum_{k=0}^{N-1} q(x_k, u_k) + p(x_N) \tag{10}$$

$$\text{s.t. } x_{k+1} = g(x(k), u(k)), \; x(0) = x_0 \;\; k = 1, 2, , N$$

$$u_k \in U, \; x_k \in X \;\; k = 0, 1, 2, , N-1$$

The terms q(x, u) and p(x) represent the stage cost and the terminal cost, respectively. Stage cost is the transitory cost along the maneuver. Terminal cost is a cost for the final maneuver. In the past, two problems often occurred when using an optimal control solution in practice. First, even with optimization algorithms taking advantage of linearities and convexities, a horizon time that is sufficiently large enough to produce desirable convergence characteristics may prove computationally prohibitive. Second, the model of the spacecraft 101 is usually inaccurate and the spacecraft 101 may be impacted by external disturbances that can cause it to diverge from the predicted path. For this reason, in the embodiments, the spacecraft state 203 may be measured at a future time period and the optimal control problem is resolved, where the measured spacecraft state x(1) 203 is considered the new initial condition. This process is embodied in the MPC 219.

Since the linearized model dynamics may not match the true dynamics or account for perturbations, the first control found u0 is applied to the spacecraft 101 and response is measured. This new state x(1) can then be considered a new initial condition and the MPC 219 can be run again to find an updated control scheme. This allows for the system to react and correct perturbations without perfect knowledge of the spacecraft system. Another advantage of MPC 219 is that constraints can be added to bound the spacecraft states 203 or control inputs which is not possible with other feedback controllers such as linear quadratic control. Finally, the MPC time horizon allows it to preemptively act to stay within the bounds rather than simply react which can allow for more judicious control usage.

The MPC 219 provides the ability to express constraints, which is not common in many feedback control solutions. Furthermore, weights in the objective functions 213 can provide intuitive "control knobs" for tuning to the desired behavior.

The guidance trajectory 245 may be a vector along which to maneuver the spacecraft 101. The guidance trajectory 245 may be calculated to maintain a desired separation distance between a given spacecraft and a virtual point 111 and/or lead spacecraft 101. The guidance trajectory 245 may be a fuel-optimal trajectory that takes the spacecraft 101 from the current spacecraft state 203 to the desired orbit within some specified time interval 263. The simulation 247 may estimate the effects of a guidance trajectory 245. The control 249 may indicate whether a spacecraft 101 will be maneuvered. In addition, the control 249 comprise at least one maneuvers.

The desired trajectory 246 may be a vector desired for a spacecraft 101 relative to a virtual point 111. The desired trajectory 246 may be the guidance trajectory 245.

Common objective functions 213 for linear systems include the $L_2$, $L_1$, and $L_\infty$ norms as they can result in quadratic and linear programs. Given an initial spacecraft state of $x_0$ 203, and a time horizon of N intervals, the $L_2$, or quadratic, objective function 213*b* can be written as shown in Equation 11 subject to Equation 12.

$$J(x,u)=\tfrac{1}{2}u_0^T R u_0+\tfrac{1}{2}\Sigma_{k=1}^{N-1}[x_k^T Q x_k+u_k^T R u_k]+\tfrac{1}{2}x_N^T P x_N \qquad (11)$$

$$x_{k+1}=Ax_k+Bu_k \qquad (12)$$

where R, Q, and P are the weightings on control usage, state error, and terminal error, respectively. For a linear system, the spacecraft dynamics become $x_{k+1}=Ax_k+Bu_k$. The $L_1$ and $L_\infty$ objective functions 213 are shown in Equations 13 and 14 respectively.

$$J_1=\Sigma_{k=1}^{N=1}|Qx_k|_1+\Sigma_{k=0}^{N-1}|Ru_k|_1+|Px_N|_1 \qquad (13)$$

$$J_\infty=\Sigma_{k=1}^{N=1}|Qx_k|_\infty+\Sigma_{k=0}^{N-1}|Ru_k|_\infty+|Px_N|_\infty \qquad (13)$$

Velocity change ($\Delta$V) 217 may be used as the metric to compare the fuel savings of the different norms. The three different object function norms 213 may be compared in terms of requisite computation time and total velocity change $\Delta$V 217.

To maintain a given spacecraft formation 109, the outer polytope boundary 207, the inner polytope boundary 209, and the drift horizon 225 are defined to force the spacecraft 101 to stay within a keep-in-boundary. This allows the spacecraft 101 to drift while also maintaining the given spacecraft 101 in the required position within the spacecraft formation 109. At each timestep k the outer polytope boundary 207 and the inner polytope boundary 209 are defined by a convex polytope consisting of a plurality faces where the position elements of the desired spacecraft state $x_{d,k}$ 203 of the spacecraft 101 exist within the polytope volume. The use of a convex polytope allows for a high degree of freedom in the possible constraints and for the formulation of the problem as a linear program. Each of the polytope faces are defined by a point p and a normal vector $\hat{\eta}$ that is assumed to point towards the interior of the outer polytope boundary 207 and/or the inner polytope boundary 209. Let r be any arbitrary point. If r is on the boarder or interior of the outer polytope boundary 207 and/or the inner polytope boundary 209 then the dot product will satisfy Equation 15.

$$\hat{\eta}\cdot(r-p)\geq 0 \text{ or, equivalently, } -\hat{\eta}^T r\leq -\hat{\eta}^T p. \qquad (15)$$

The matrix constraint 211 may be used to force the spacecraft state $x_k$, 203 consisting of three position and three velocity elements, to be within the outer polytope boundary 207 and/or the inner polytope boundary 209 defined at time k. This is formulated as Equation 16 and 17.

$$A_{poly,k}x_k \leq b_{poly,k} \qquad (16)$$

where $$A_{poly,k}=\begin{bmatrix} -\hat{\eta}_{1,k}^T & 0_{1\times 3} \\ -\hat{\eta}_{2,k}^T & 0_{1\times 3} \\ \vdots & \vdots \\ -\hat{\eta}_{M,k}^T & 0_{1\times 3} \end{bmatrix} b_{poly,k}=\begin{bmatrix} -\hat{\eta}_{1,k}^T p_{1,k} \\ -\hat{\eta}_{2,k}^T p_{2,k} \\ \vdots \\ -\hat{\eta}_{M,k}^T p_{M,k} \end{bmatrix} \qquad (17)$$

with $\hat{\eta}_{i,k}$ and $p_{i,k}$ being the normal and point associated with the ith face of the polytope at time k. This implements a zero-padded version of Equation 16 which allows the constraint to ignore the velocity.

The outer polytope boundary 207 and/or the inner polytope boundary 209 may be a close approximation of a sphere, an ROE polytope, a six-sided box and/or a pyramid. A spherical polytope approximation may be done by selecting points from a spherical surface such as in FIG. 3A and using the points for the vertices of the polytope. The convex hull formed by these points is then found and each face is used as a polytope face. At each simulation step, the polytope boundary 207/209 is formed by adding the points $p_{i,k}$ to each position along the desired trajectory of the spacecraft 101. Additional polytope boundaries 207/209 are shown in FIGS. 3E and 3H.

The embodiments implement the MPC 219 to calculate the optimal control sequence for the case when the spacecraft 101 exits a polytope boundary 207/209. As used herein, exits refers to reaches, exits, and/or will exit polytope boundary 207/209 within a specified time interval. The embodiments may implement $L_2$, $L_1$, and $L_\infty$ norm objective functions 213 with the goal of comparing the fuel savings. Exemplary objective functions 213 are described hereafter.

If it is desired that the spacecraft state x 203, tracks a desired trajectory, $x_d$, then the error state $x_e=x-x_d$ is driven to zero, and the objective function 213 may be updated to account for this. In one embodiment, the desired trajectory is the desired relative state 203 of each spacecraft 101 and is initialized using ROE and converted to the LVLH frame. The desired spacecraft state 203 for each spacecraft 101 is updated using the HCW equations.

Using the desired state, the $L_2$ objective function 213*b* can be written as Equation 18.

$$J(x,u)=\tfrac{1}{2}u_0^T R u_0+\tfrac{1}{2}\Sigma_{k=1}^{N-1}[x_{e,k}^T Q x_{e,k}-2x_{d,k}^T Q x_{e,k}+u_k^T R u_k]+\tfrac{1}{2}x_{e,N}^T P x_{e,N}. \qquad (18)$$

The optimization problem with the polytope constraint can be written as Equation 19.

$$\min_{x,u} \frac{1}{2}u_0^T R u_0 + \frac{1}{2}\sum_{k=1}^{N-1}\left[x_k^T Q x_{e,k} - 2x_{d,k}^T Q x_{e,k} + u_k^T R u_k\right] + \frac{1}{2}\left(x_{e,N}^T P x_{e,N} - 2x_{d,N}^T P x_{e,N}\right) \tag{19}$$

$$\text{s.t.}\ x_{k+1} = A_D x_k + B_D u_k \quad k = 0, 1, , N-1$$

$$A_{poly,k} x_k \le b_{poly,k} \quad k = 1, 2, , N$$

$$u_k \le 1u_{max} \quad k = 0, 1, 2, , N-1$$

$$u_k \ge -1u_{max} \quad k = 0, 1, 2, , N-1$$

The constraints ensure the dynamics are followed, keep the spacecraft 101 within the outer polytope boundary 207 and/or inner polytope boundary 209, and limit the maximum and minimum control accelerations.

The $L_1$ objective function 213*a* with $x_e$ may be Equation 20.

$$J_1=\Sigma_{k=1}^{N=1}|Qx_{e,k}|_1+\Sigma_{k=0}^{N-1}|Ru_k|_1+|Px_{e,N}|_1. \tag{20}$$

The full optimization formulation with the polytope constraint for the $L_1$ objective function 213*b* may then be given by Equation 21.

$$\min_{x,u} \sum_{k=1}^{N-1}|Qx_{e,k}|_1 + \sum_{k=0}^{N-1}|Ru_k|_1 + |Px_{e,N}|_1 \tag{21}$$

$$\text{s.t.}\ x_{k+1} = A_D x_k + B_D u_k \quad k = 0, 1, , N-1$$

$$A_{poly,k} x_k \le b_{poly,k} \quad k = 1, 2, , N$$

$$u_k \le 1u_{max} \quad k = 0, 1, 2, , N-1$$

$$u_k \ge -1u_{max} \quad k = 0, 1, 2, , N-1$$

The $L_\infty$ norm objective function 213*c* with $x_e$ may be written as Equation 22.

$$J_\infty=\Sigma_{k=1}^{N=1}|Qx_{e,k}|_\infty+\Sigma_{k=0}^{N-1}|Ru_k|_\infty+|Px_{e,N}|_\infty. \tag{22}$$

The full optimization formulation with the polytope constraint for the $L_\infty$ objective function norm 213*c* is then Equation 23.

$$\min_{x,u} \sum_{k=1}^{N-1}|Qx_{e,k}|_\infty + \sum_{k=0}^{N-1}|Ru_k|_\infty + |Px_{e,N}|_\infty \tag{23}$$

$$\text{s.t.}\ x_{k+1} = A_D x_k + B_D u_k \quad k = 0, 1, , N-1$$

$$A_{poly,k} x_k \le b_{poly,k} \quad k = 1, 2, , N$$

$$u_k \le 1u_{max} \quad k = 0, 1, 2, , N-1$$

$$u_k \ge -1u_{max} \quad k = 0, 1, 2, , N-1$$

In one embodiment, the objective function 213*d* is employed based on Equation 24, wherein R is a control usage weight, Q is a state error weight, and P is a terminal error weight.

$$J(x,u)_p=\|u_0\|_{R,p}+\Sigma_{k=1}^{N-1}[\|x_k\|_{Q,p}+\|u_k\|_{R,p}]+\|x_N\|_{P,p} \tag{24}$$

As the control usage weighting R is increased, the spacecraft 101 is controlled more frequently. As the state error weight Q is increased, the spacecraft 101 is maneuvered closer to a desired trajectory. The maneuver strategy 215 is described in FIGS. 3B-C and 3I-J. The switching strategy 223 and drift horizon 225 are described in FIG. 3D. The switching strategy 223 may be subject to a switching condition 251. The ROE data is described in FIG. 2D.

Figure 2D:
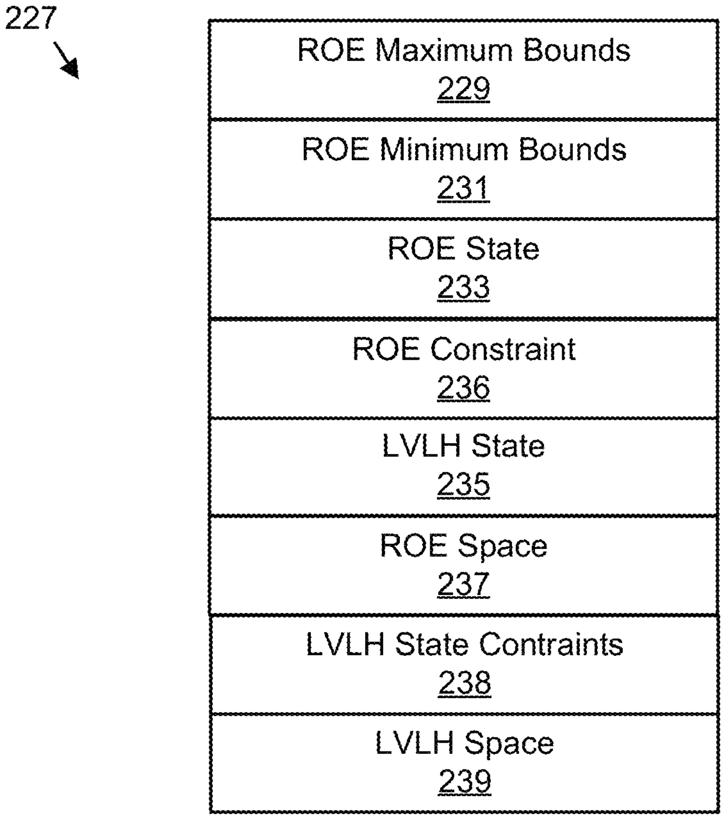
FIG. 2D is a schematic block diagram illustrating one embodiment of Relative Orbital Elements (ROE) data.

FIG. 2D is a schematic block diagram illustrating one embodiment of the ROE data 227. In the depicted embodiment, the ROE data 227 includes ROE maximum bounds 229, ROE minimum bounds 231, at least one ROE state 233, at least one corresponding LVLH state 235, a ROE space 237, LVLH state constraints 238, and an LVLH space 239. The ROE state $\alpha_i$ 233 includes a plurality of ROE elements $\delta\alpha$, $\delta\lambda$, $\delta e_x$, $\delta e_y$, $\delta i_x$, $\delta i_y$. The ROE states 233 may be based on the ROE data 227. The ROE space 237 and/or LVLH space 239 may be defined by an outer polytope boundary 207, an inner polytope boundary 209, and/or a boundary including an ROE-based polytope as will be described hereafter in FIG. 3E.

Figure 3A:
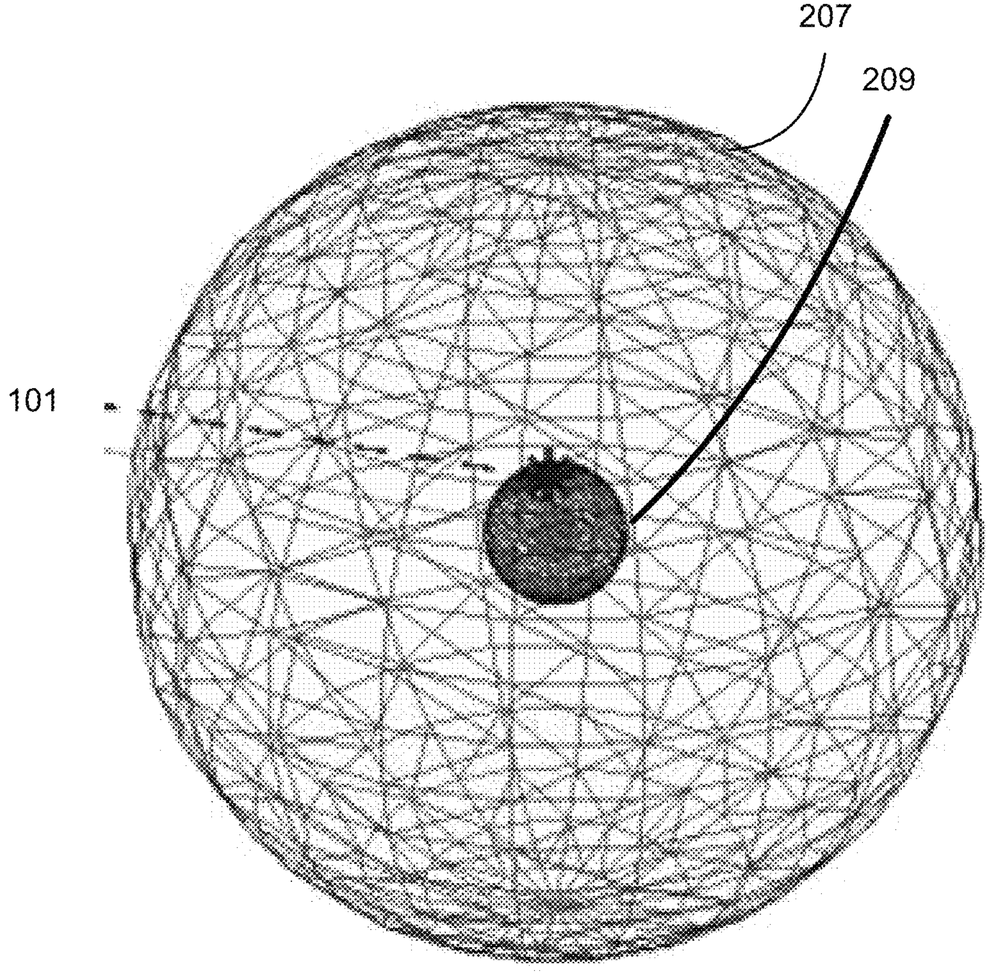
FIG. 3A is a drawing illustrating one embodiment of outer and inner polytope boundaries.

FIG. 3A is a drawing illustrating one embodiment of the outer polytope boundary 207 and the inner polytope boundaries 209. The outer polytope boundary 207 and the inner polytope boundaries 209 are employed to maintain a position of a spacecraft 101 relative to the virtual point 111. By individually maintaining the position of each spacecraft 101 relative to the virtual point 111, the positions of all spacecraft 101 within the spacecraft formation 109 are maintained. In one embodiment, no outer polytope boundaries 207 of the plurality of spacecraft 101 overlap.

In the depicted embodiment, the polytopes 207/209 are sphere-based polytopes. For the sphere-based polytope, a number of points are selected on the surface of a sphere with a radius of a specified length. The points chosen are those which result from the crossing of evenly dispersed lines of latitude and longitude.

Figure 3B:
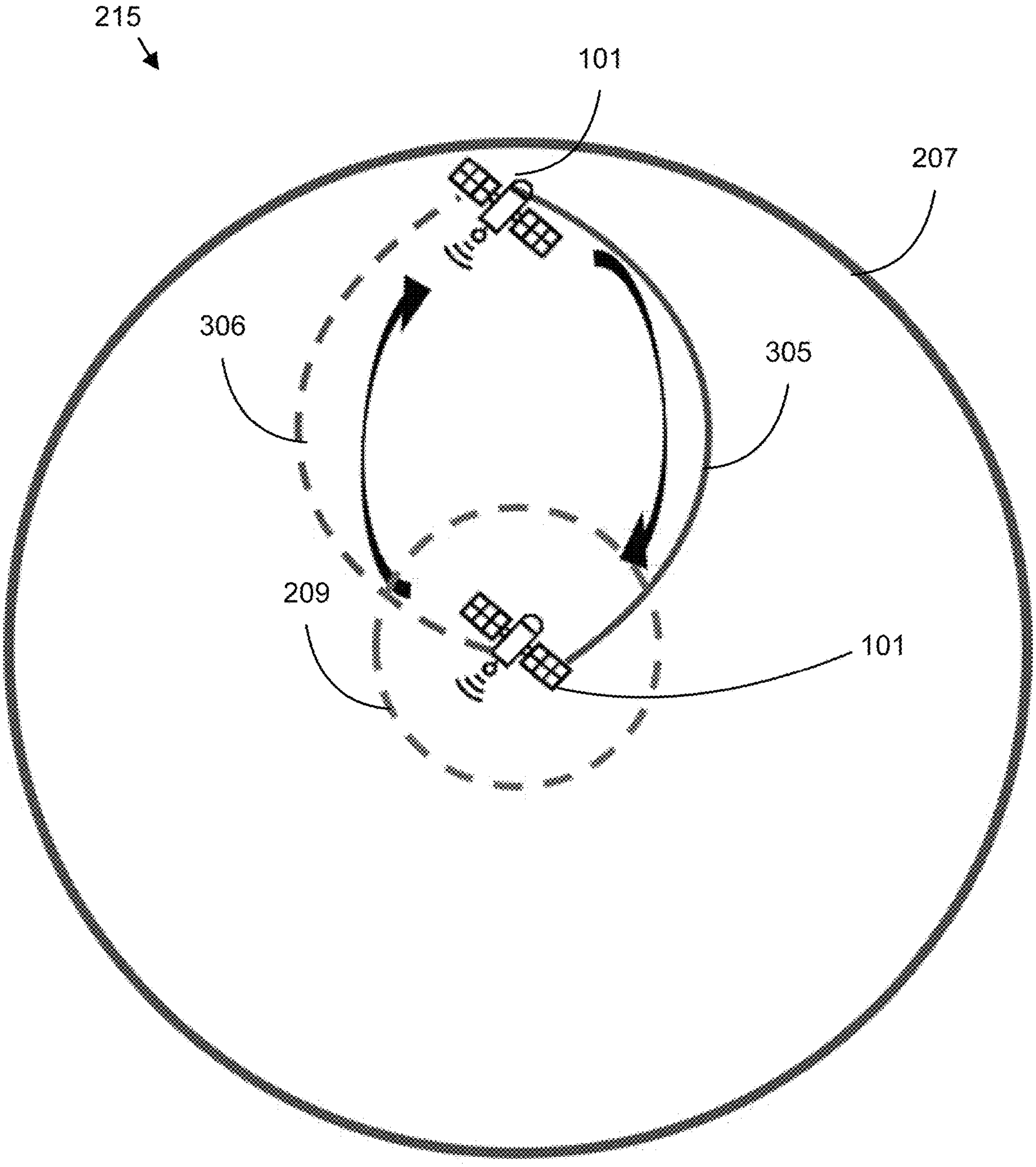
FIG. 3B is a drawing illustrating one embodiment of a large maneuver strategy.

FIG. 3B is a drawing illustrating one embodiment of a large maneuver strategy 215. As shown, a spacecraft 101 has drifted 306 outside of the inner polytope boundary 209 and may exit the outer polytope boundary 207. In the depicted maneuver strategy 215, fewer maneuvers 305 are used to control a spacecraft 101 to within and/or to the center of the outer polytope boundary 207 and/or inner polytope boundary 209. The large maneuver strategy 215 may comprise no more than a maneuver threshold of maneuvers 305 to move the spacecraft 101 within the outer polytope boundary 207 and/or inner polytope boundary 209. The maneuver threshold may be in the range of 2 to 20 maneuvers 305.

Figure 3C:
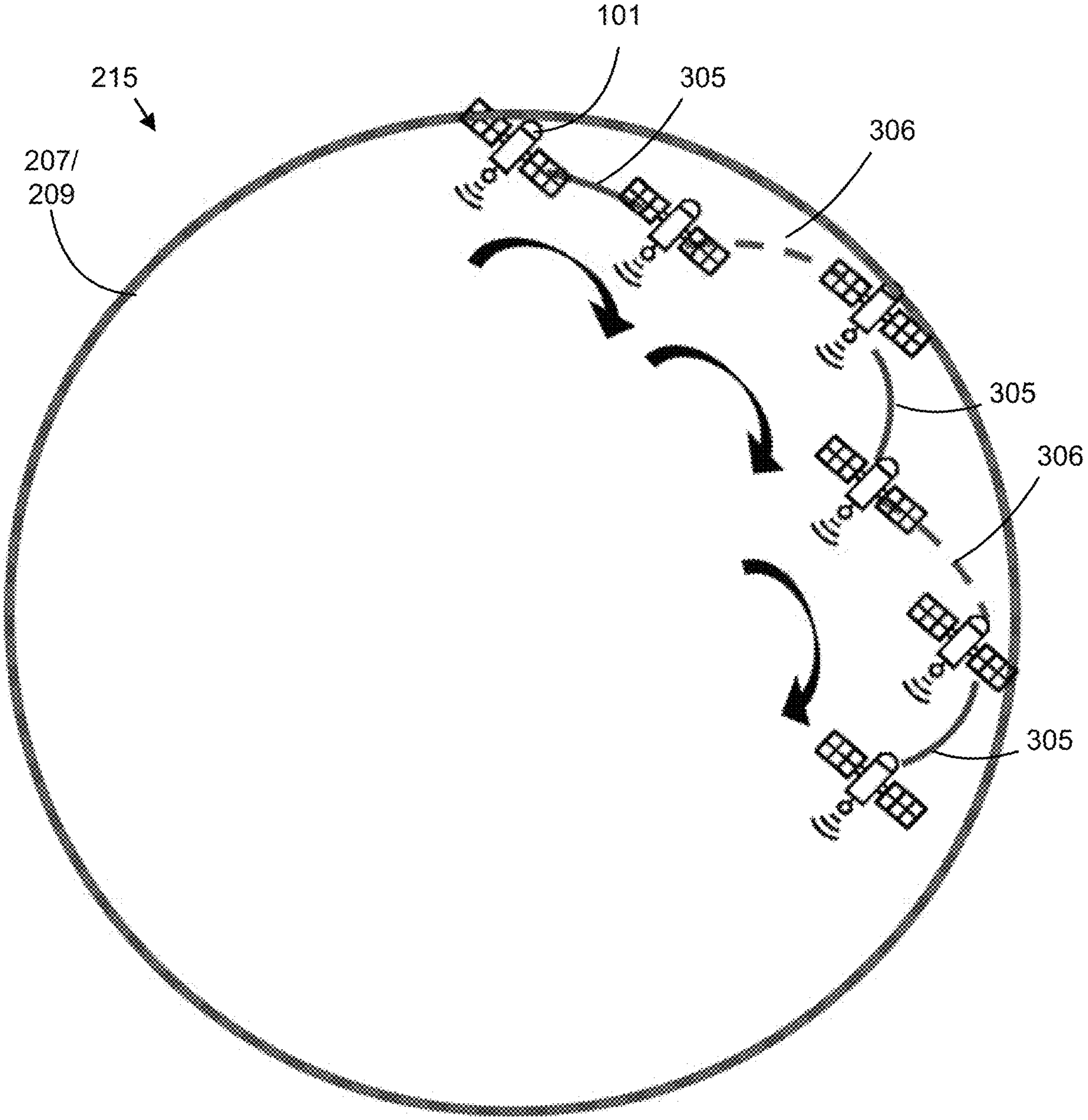
FIG. 3C is a drawing illustrating one embodiment of a small maneuver strategy.

FIG. 3C is a drawing illustrating one embodiment of a small maneuver strategy 215 maneuver strategy 215. The spacecraft 101 is shown drifting 306 to exit the outer polytope boundary 207. In the depicted embodiment, the outer polytope boundary 207 and the inner polytope boundary 209 have a same radius. For the small maneuver strategy 215 maneuver strategy 215, more maneuvers 305 are used to control a spacecraft 101 within the outer polytope boundary 207 and/or inner polytope boundary 209. The small maneuver strategy 215 may comprise at least the maneuver threshold of maneuvers 305 to move the spacecraft 101 within the inner polytope boundary 209.

The embodiments may employ the large maneuver strategy 215 and the small maneuver strategy 215 to minimize fuel usage. The large maneuver strategy 215 periodically uses large maneuvers 305 to drive the position and velocity error to near zero. The small maneuver strategy 215 uses many small maneuvers 305 to stay just inside the boundary of the outer polytope boundary 207 and/or inner polytope boundary 209.

Figure 3D:
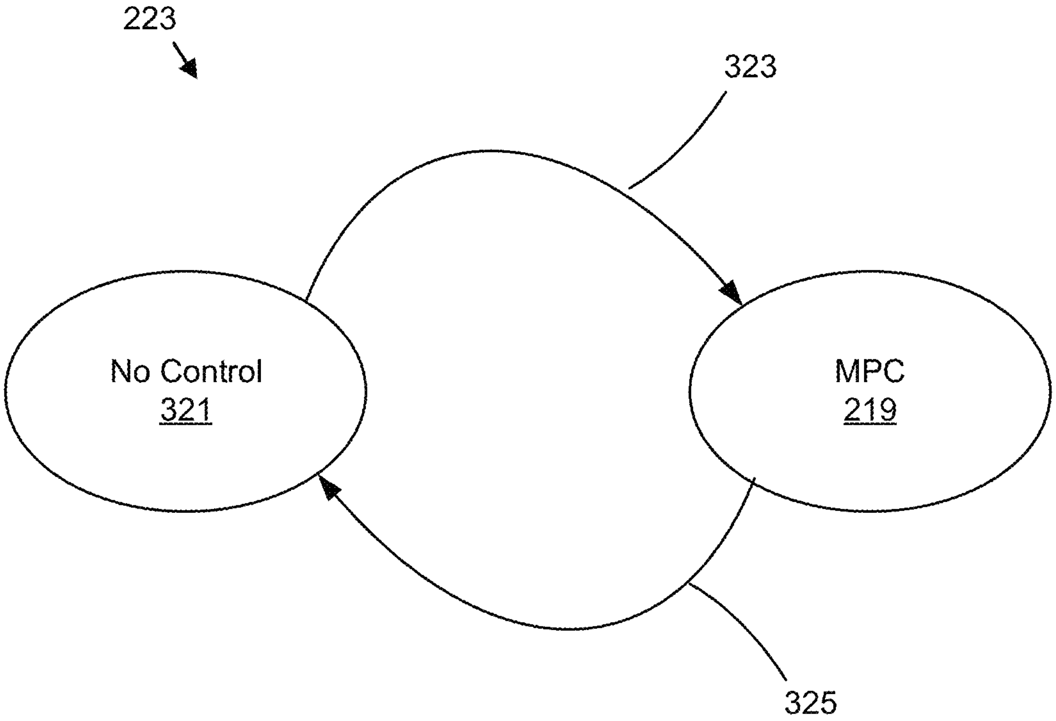
FIG. 3D is a drawing illustrating one embodiment of a switching strategy.
Figure 3E:
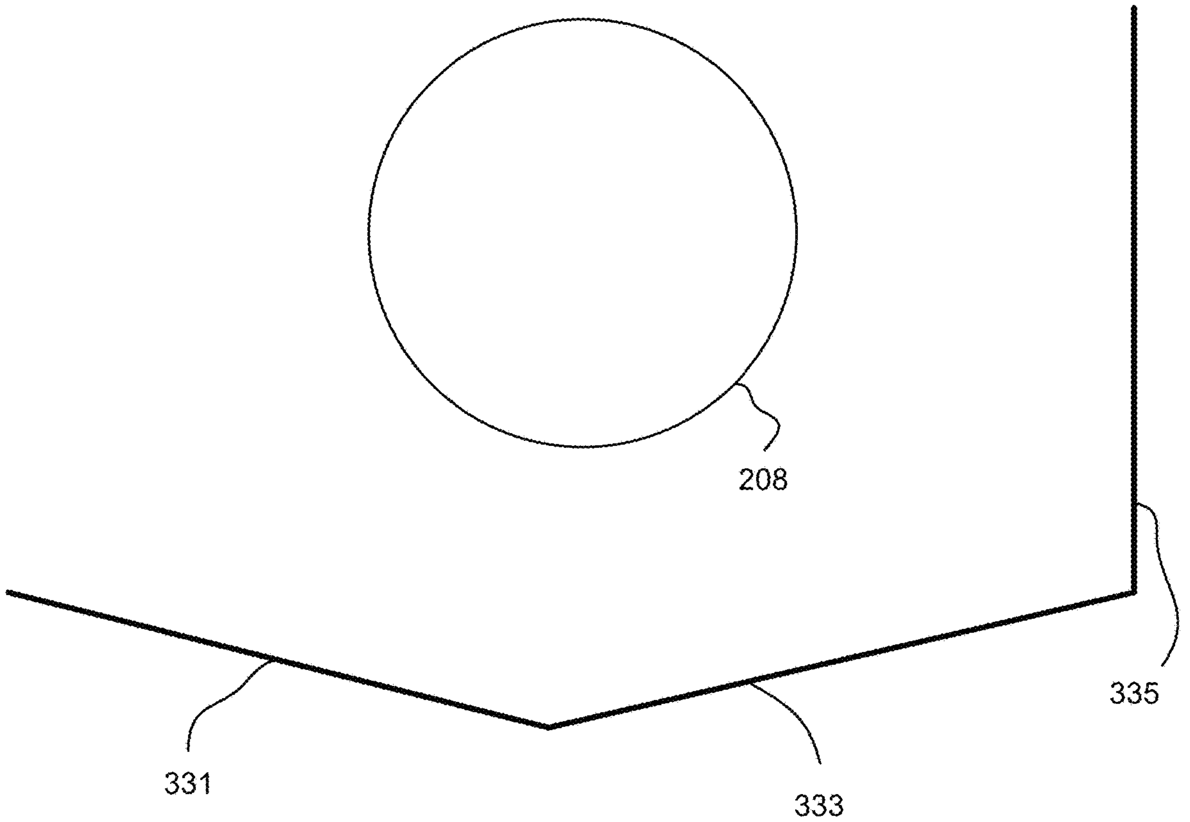
FIG. 3E is a drawing illustrating one embodiment of a convex polytope.

FIG. 3D is a drawing illustrating one embodiment of the switching strategy 223. The switching strategy 223 may determine when to employ the MPC 219 to allow the spacecraft 101 to coast or drift. The switching conditions 323/325 may be the outer polytope boundary 207. The outer polytope boundary 207 may be a keep-in-boundary. In one embodiment, if a maneuver switching condition 323 determines that the spacecraft 101 will leave the keep-in-boundary then the MPC 219 is activated. If a drift switching condition 325 determines that the spacecraft 101 will remain within the keep-in-boundary, the MPC 219 is deactivated and no control 321 is employed.

In the embodiment of FIG. 3C, the inner polytope boundary 209 is set to have the same radius as the outer polytope boundary 207. This causes the MPC 219 to only be on long enough to keep the spacecraft 101 just inside the outer polytope boundary 207. The outer polytope boundary 207 and the inner polytope boundary 209 are depicted in FIGS. 3A-C.

The inner polytope boundary 209 may be used in the design of the weighting matrix Q. This may encourage the spacecraft 101 to stay in the inner polytope boundary 209. The weighting matrices Q and R may be chosen using Equations 25 and 26.

$$Q_{ij} = \begin{cases} \frac{1}{z_{i,max}^2} & i = j \\ & i, j \in 1, \ldots, \ell \\ 0 & i \neq j \end{cases} \quad (25)$$

$$R_{ij} = \begin{cases} \frac{1}{u_{i,max}^2} & i = j \\ & i, j \in 1, \ldots, k \\ 0 & i \neq j \end{cases} \quad (26)$$

where $z_{i,max}$ is the maximum desired deviation for the $i^{th}$ state element and is the maximum desired control for the $i^{th}$ control element. This effectively normalizes or nondimensionalizes the optimization problem so that the states and controls are equally balanced. The choice of Q and R guide, but do not constrain, the evolution of the state error and control usage and without other constraints there is no guarantee that the $z_{i,max}$ and $u_{i,max}$ values will not be exceeded.

Given Q, and R, the terminal cost, P, of the system can be designed to ensure asymptotic stability of the MPC 219. To guarantee stability, the terminal cost is chosen to represent the cost-to-go of the unconstrained infinite horizon problem for the $L_2$ norm. The Discrete-time Algebraic Riccati Equation (DARE) can be used to find the cost-to-go, $X^T P_\infty X$, or the unconstrained infinite horizon problem. The DARE is represented as shown in Equation 27, wherein A and B are controllable, R is positive definite, Q is positive, semi-definite, and completely observable.

$$0 = A'P_\infty A - P_\infty + Q - A'P_\infty B(B'P_\infty B + R)^{-1} B'P_\infty A. \quad (27)$$

In one embodiment, the objective function 213*d* of Equation 24 is used. The $P_\infty$ found solving the DARE is then used as the matrix in the terminal cost, P, in the objective function, Equation 15. This guarantees asymptotic stability of the system for the $L_2$ norm objective function 213. In one embodiment A and B may be completely controllable, which is true for the HCW system. R may be be positive definite, and Q may be positive semi-definite and completely observable.

In one embodiment, the terminal error weighting $P_\infty$ is chosen to represent a cost-to-go of an unconstrained infinite horizon problem for an $L_2$ norm. The DARE Equation 27 may be used to calculate the cost-to-go, $X^T P_\infty X$.

DARE may be solved for P, and P used as the matrix in the terminal cost, P, in Equation 24. So constrained, the embodiment may provide asymptotic stability for the spacecraft 101 for the $L_2$ norm formulation. For $L_1$ and $L_\infty$, if the exact discrete system is asymptotically stable, then $X_f$ may be chosen as a positively invariant set of the system of Equation 28.

$$x(k+1) = Ax(k) \; s.t. \; x \in X \quad (28)$$

Therefore, the input 0 is feasible in $X_f$ and the Lyapunov inequality for the $L_\infty$ and $L_1$ cases is given by Equation 29, where p=1 or p=∞ for the $L_1$ and $L_\infty$ norms, respectively.

$$-\|Px\|_p + \|PAx\|_p + \|Qx\|_p \leq 0 \; \forall x \in X_f \quad (29)$$

Equation 29 may be satisfied if a P is chosen that satisfies the Lyapunov function for the $L_1$ and $L_\infty$ cases. In one embodiment, the $P_p$ found solving Equation 29 is then used in the objective function. This may guarantee asymptotic stability of the system.

In one embodiment, if $X_f$ can be computed, $X_f$ may be used as the terminal constraint. Equation 30 may be satisfied by the infinite time unconstrained optimal cost matrix in Equation 31, wherein Equation 31 represents the optimal infinite horizon cost function.

$$\min_{u \in U, \; Ax + Bu \in X_f} (-p(x) + q(x, u) + p(Ax + Bu)) \leq 0, \quad (30)$$

$$\forall x \in X_f$$

$$J_\infty^*(x(0)) = \|P_\infty x(0)\|_\infty \quad (31)$$

To determine if the spacecraft 101 will exit the outer polytope boundary 207, the drift horizon $N_{drift}$ 225 may be used. The spacecraft state x 203 is propagated using the discrete form of the HCW equations orbital data 221 as Equation 32.

$$\hat{x}_{k+1} = A_D \hat{x}_k \; k = 0, N_{drift} - 1 \quad (32)$$

where $x_0$ is the current state 203 of the spacecraft 101 and $\hat{x}_k$ are the projected spacecraft states 203 of the spacecraft 101 while drifting. Since this propagation is used to determine the behavior of the spacecraft 101 once the controls are turned off, no control inputs are used.

At each timestep along the drift horizon 225, the outer polytope boundary 207 centered on the desired trajectory at that time is determined. Assuming that $\hat{p}_i$ is the ith point of the outer polytope boundary 207 and is defined with axes identical to the LVLH frame but centered on the desired position of the spacecraft 101, then $p_{i,k}$ is calculated using Equation 33.

$$p_{i,k} = \hat{p}_i + x_{d,k} \; \forall i \in M, \; k = 0, N_{drift} \quad (33)$$

where M is the number of points used to define the polytope boundary 207/209, $x_{d,k}$ is the $k^{th}$ state along the desired orbital path 107, and $p_{i,k}$ is used to define the polytope inequalities.

The drift states $\hat{x}$ 241 may be compared against the polytope using Equation 34, which is identical in form to how the polytope volume is used in the MPC 219 but the time horizon $N_{drift}$ may not be identical to the MPC horizon $N_{MPC}$.

$$A_{poly,k} \hat{x}_k \leq b_{poly,k} \; k = 0, 1, N_{drift} \quad (34)$$

If Equation 29 holds for all k along the drift horizon 225, then the spacecraft 101 is projected to remain inside the outer polytope boundary 207 and the control is not needed.

However, if there is any k where the equation does not hold, then the spacecraft 101 is projected to drift out of the outer polytope boundary 207. The MPC 219 then turns on and maneuvers the spacecraft 101. Once the MPC 219 turns on, the spacecraft 101 continues to recalculate and implement controls each timestep until the drift switching condition 325 is met.

The inner polytope boundary 209 may be used to determine if a drift switching condition 325 is satisfied, turning MPC 219 off. The inner polytope boundary 209 may also be defined in the LVLH frame centered on the desired orbital path 107 and is translated as shown in Equation 35.

$$p'_{i,k}=\hat{p}'_i+x_{d,k}\ \forall i\in M',\ k=0,N_{drift} \tag{35}$$

where the prime indicates that the point is on the inner polytope boundary 209. The drift states 241 are then checked against the inner polytope and if Equation 30 holds true over the entire drift horizon 225, the positional requirement of the spacecraft 101 is considered to be met. The inner polytope boundary radius may also be used to set the Q weight on desired position deviation as shown in Equation 36.

$$A'_{poly,k}\hat{x}_k\leq b'_{poly,k}\ k=0,1,N_{drift} \tag{36}$$

In one embodiment, a velocity check is also implemented that compares the velocity of the spacecraft 101 at each point along the drift trajectory with the desired orbital track 107. The cutoff condition is defined using Equation 37.

$$|v-v_d|_2\leq\delta v \tag{37}$$

where v is the current velocity, $v_d$ is the desired velocity, and δv is the allowable velocity error. The MPC 219 turns off if both the inner polytope boundary 209 and the velocity condition are met. The purpose of the velocity switching condition is to guide the spacecraft 101 to better match the desired orbital track 107 without having to drastically tighten the inner polytope boundary 209.

FIG. 3E is a drawing of an ROE-based polytope 208. The outer polytope boundary 207 may be an ROE-based polytope 208. In addition, the inner polytope boundary 209 and/or drift horizon 225 may also be an ROE-based polytope 208. The ROE-based polytope 208 is shown as a sphere along a radial axis 331, an along orbital track axis 333, and a cross orbital track axis 335. The ROE-based polytope 208 may change in shape over time.

Given an initial LVLH state $x_i$ of a spacecraft 101, the ROE-based polytope 208 is defined in the following manner. Using the virtual point's 111 state as a reference, the LVLH state is converted to an ROE representation $\delta\alpha_i$. Each ROE element is bounded by some $\sigma\in\{\sigma_-, \sigma_+\}$ which represents the allowable positive and negative deviations from the nominal spacecraft state 203. Every combination of maximum ROE bounds 229 and minimum ROE bounds 231 for each ROE element is shown in Equation 38.

$$\sigma_i\in\begin{Bmatrix}\sigma_{\delta a,-},\ \sigma_{\delta a,max}\\ \sigma_{\delta\lambda,-},\ \sigma_{\delta\lambda,+}\\ \sigma_{\delta e_x,-},\ \sigma_{\delta e_x,+}\\ \sigma_{\delta e_y,-},\ \sigma_{\delta e_y,+}\\ \sigma_{\delta i_x,-},\ \sigma_{\delta i_x,+}\\ \sigma_{\delta i_y,-},\ \sigma_{\delta i_y,+}\end{Bmatrix} \tag{38}$$

The maximum and minimum bounds are added to the nominal ROE state 233 of Equation 39.

$$\delta\alpha_i=\begin{bmatrix}\delta a\\ \delta\lambda\\ \delta e_x\\ \delta e_y\\ \delta i_x\\ \delta i_y\end{bmatrix}+\sigma_i \tag{39}$$

This results in 64 different ROE states 233 that represent the allowable bounds in ROE space 237. Each of these are then converted to Cartesian coordinates in the LVLH frame, again using the virtual point 111 as a reference, generating a cloud of states centered on the nominal ROE state 233. The convex hull of the positions of all the points is then found and used as the ROE polytope 208. The conversion of the constraints from ROE space 237 to LVLH space 239 may cause minor deviations in the constraints.

When multiple ROE-based polytopes 208 are desired along an orbital track 107, the point cloud is found in LVLH space 239. Then, instead of dropping the velocity terms, each point is propagated forward the desired number of steps, using HCW equations. At each point along the orbital track 107, there is now a cloud of points that can be converted to ROE-based polytopes 208 by the preceding method where the convex hull of positions is found. The ROE polytope 208 also could be computed by propagating the ROEs and then converting to LVLH states 235. This would also require propagating reference ROE states 233 which are needed for the conversion. By propagating the ROE-based polytope 208 in LVLH space, only one set of ROE states 233 needs to be propagated and no additional conversions are required.

The outer polytope boundary 207, regardless of shape, only constrains a spacecraft's position in the LVLH space 239. However, when the spacecraft's trajectory is compared against a series of ROE-based polytopes 208, there is an implicit constraint on the velocity since the spacecraft 101 cannot move in such a way that it would breach the position constraints in the future. While each ROE state 233 corresponds to a full LVLH state 235 with position and velocity, the velocity portions are ignored when developing the ROE-based polytope 208. The spacecraft position may exist within the ROE-based polytope 208 position constraint, but the spacecraft velocity may mean that original boundaries, defined in the ROE space 237, are being breached. This should only be a transitory event since the sequence of position constraints approximates a velocity bound.

Figure 3F:
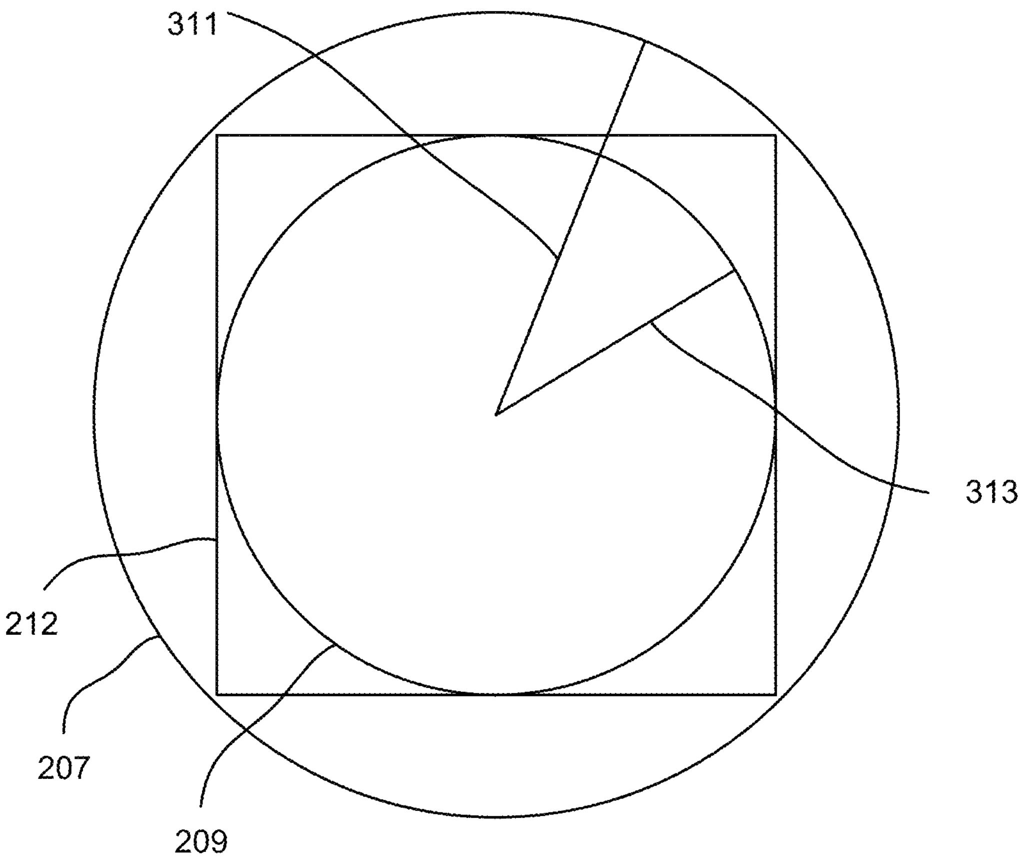
FIG. 3F is a drawing illustrating one embodiment of a ROE-based polytope defined by in outer polytope boundary and an inner polytope boundary.

FIG. 3F is a drawing illustrating one embodiment of a convex polytope 212 defined by an outer polytope boundary 207 and an inner polytope boundary 109. The convex 212 may be a convex shape. In the depicted embodiment, the convex polytope 212 is a cube. However, a three-dimensional convex polytope shape may be employed. The outer polytope boundary 207 has an outer polytope radius 311. The inner polytope boundary has an inner polytope radius 313.

In one embodiment, the inner polytope boundary 209 is modeled as the convex shape of the convex polytope 212. The reduced complexity of the convex shape may reduce the computational overhead of determining that the inner polytope boundary is breached, improved the efficiency of the embodiments.

Figure 3G:
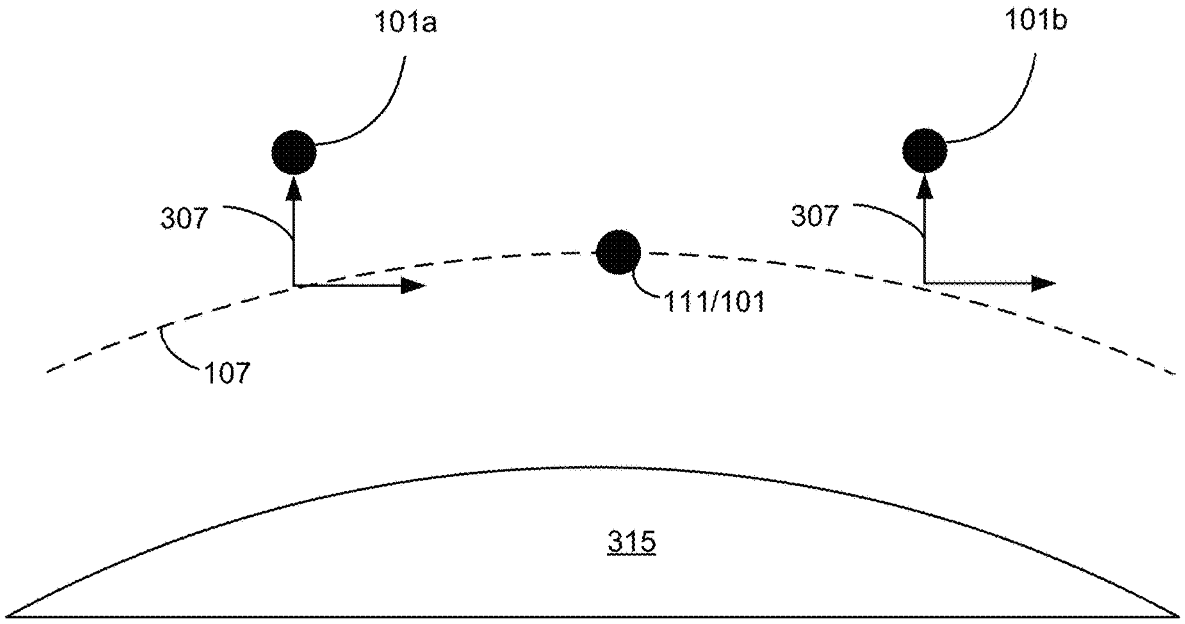
FIG. 3G is a drawing illustrating one embodiment of an agent spacecraft orbit.
Figure 3H:
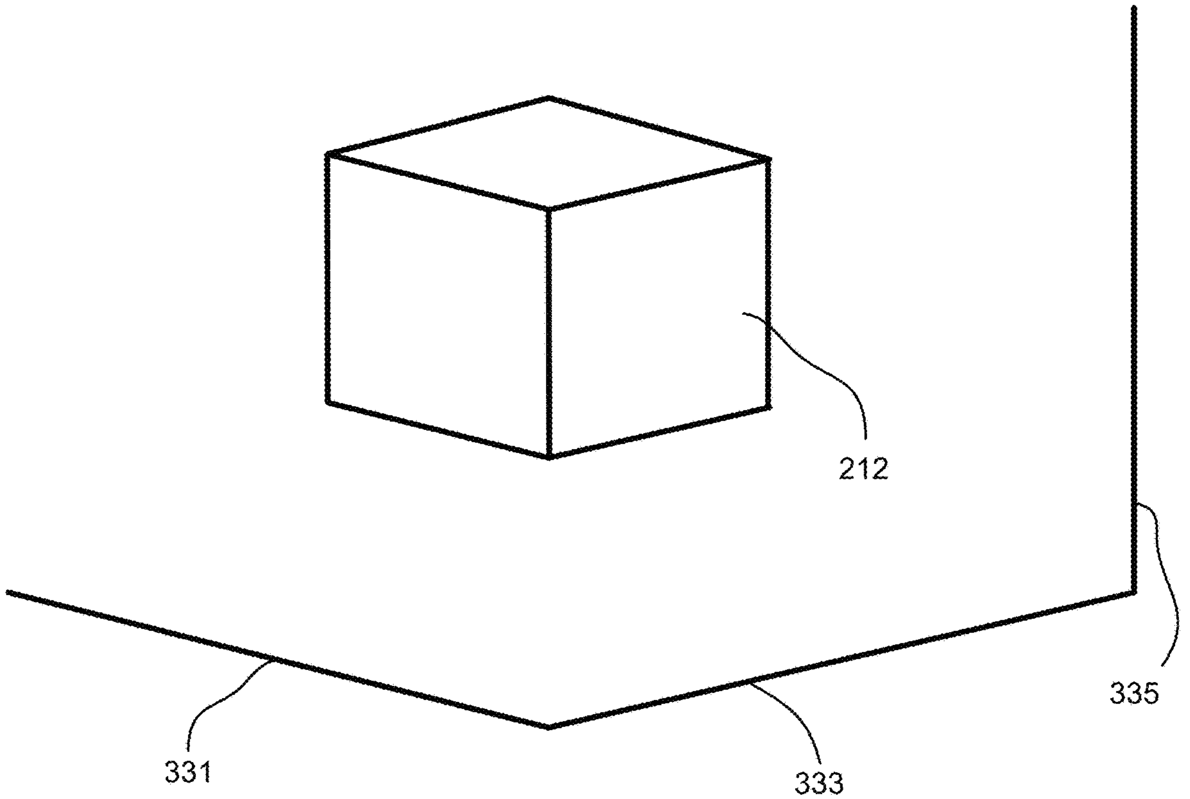
FIG. 3H is a drawing illustrating of one embodiment of a cube-based polytope.

FIG. 3G is a drawing illustrating one embodiment of an agent spacecraft orbit relative to a virtual point 111. The virtual point 111 may be a spacecraft 111. The virtual point 111 follows an orbital path 107 about the earth 315. The orbital path 107 may be a drift trajectory. The agent spacecraft 101*a* has a flight path/drift trajectory 307 relative to the virtual point 111. In the depicted embodiment, the flight path/drift trajectory 307 is shown comprising vertical and horizontal components.

FIG. 3H is a drawing illustrating of one embodiment of a convex polytope 212. In the depicted embodiment, the convex polytope 212 is a cube and/or six-sided error box. The convex polytope 212 is shown along the radial axis 331, the along orbital track axis 333, and the cross-orbital track axis 335.

Figure 3I:
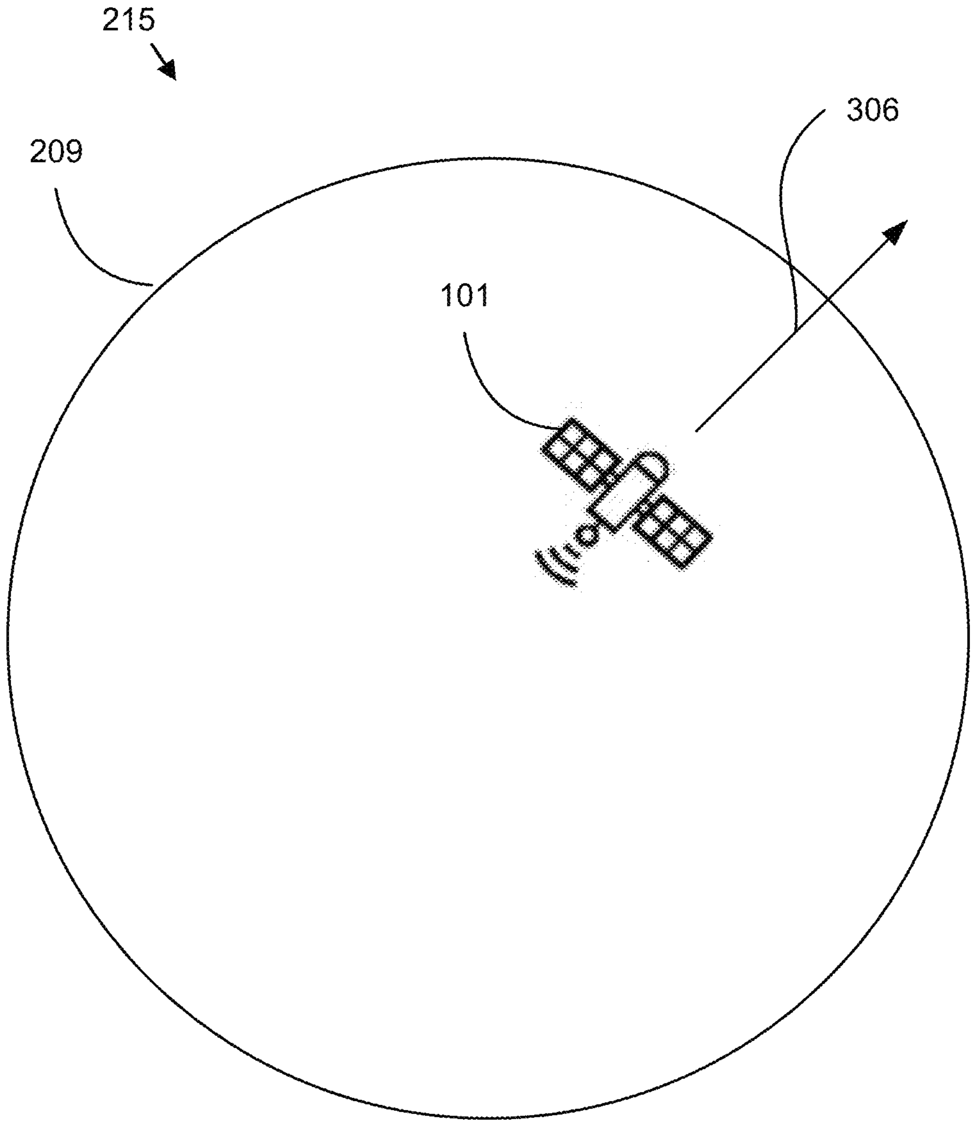
FIG. 3I is a drawing illustrating one embodiment of a maneuver strategy.

FIG. 3I is a drawing illustrating one embodiment of an optimal guidance maneuver strategy 215. In the depicted embodiment, a spacecraft 101 is shown within an inner polytope boundary 209. The spacecraft 101 is determined to drift 306 to breach the inner polytope boundary 209.

Figure 3J:
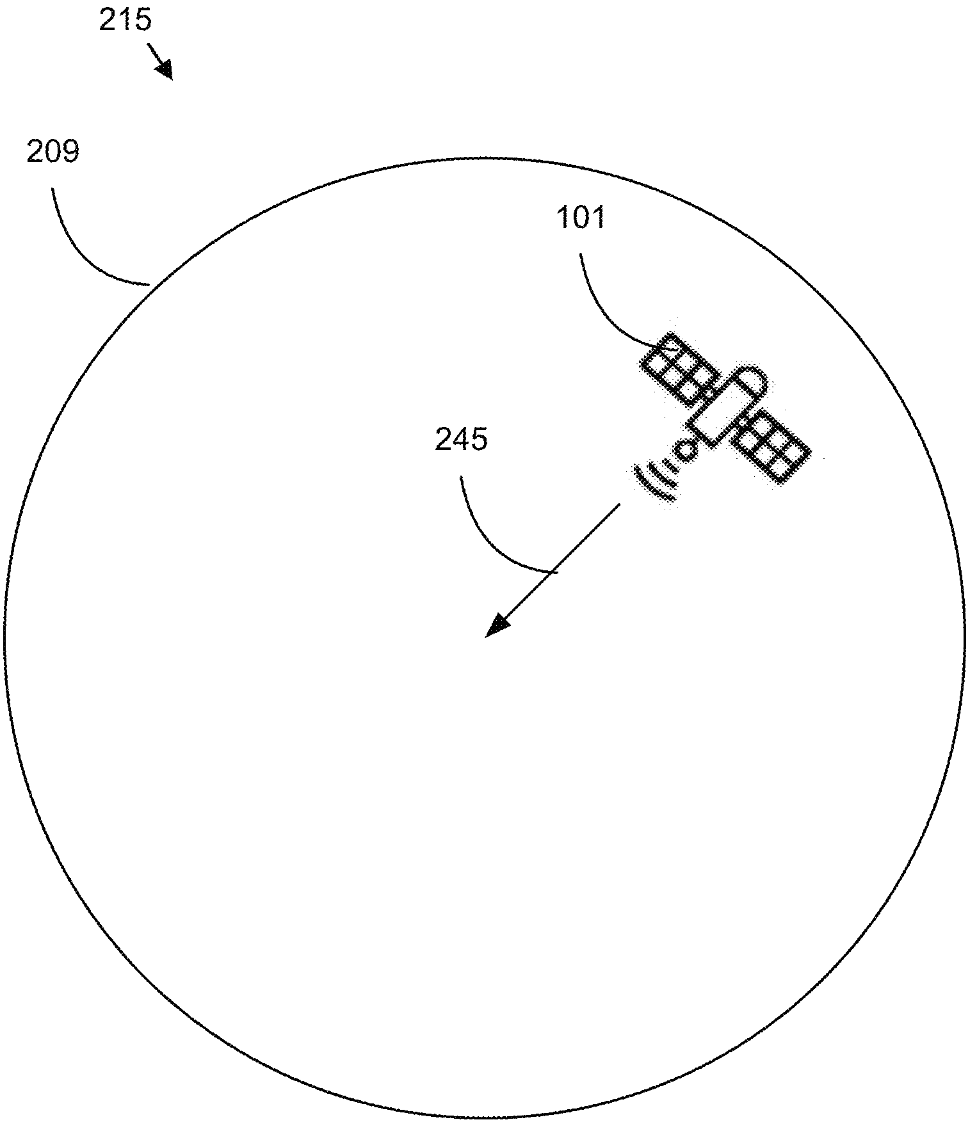
FIG. 3J is a drawing illustrating one embodiment of a maneuver strategy.

FIG. 3J is a drawing illustrating one embodiment of an optimal guidance maneuver strategy 215. In the depicted embodiment, a guidance trajectory 245 is calculated to maneuver the spacecraft 101 of FIG. 3I to prevent the spacecraft 101 from breaching the inner polytope boundary 209.

Figure 3K:
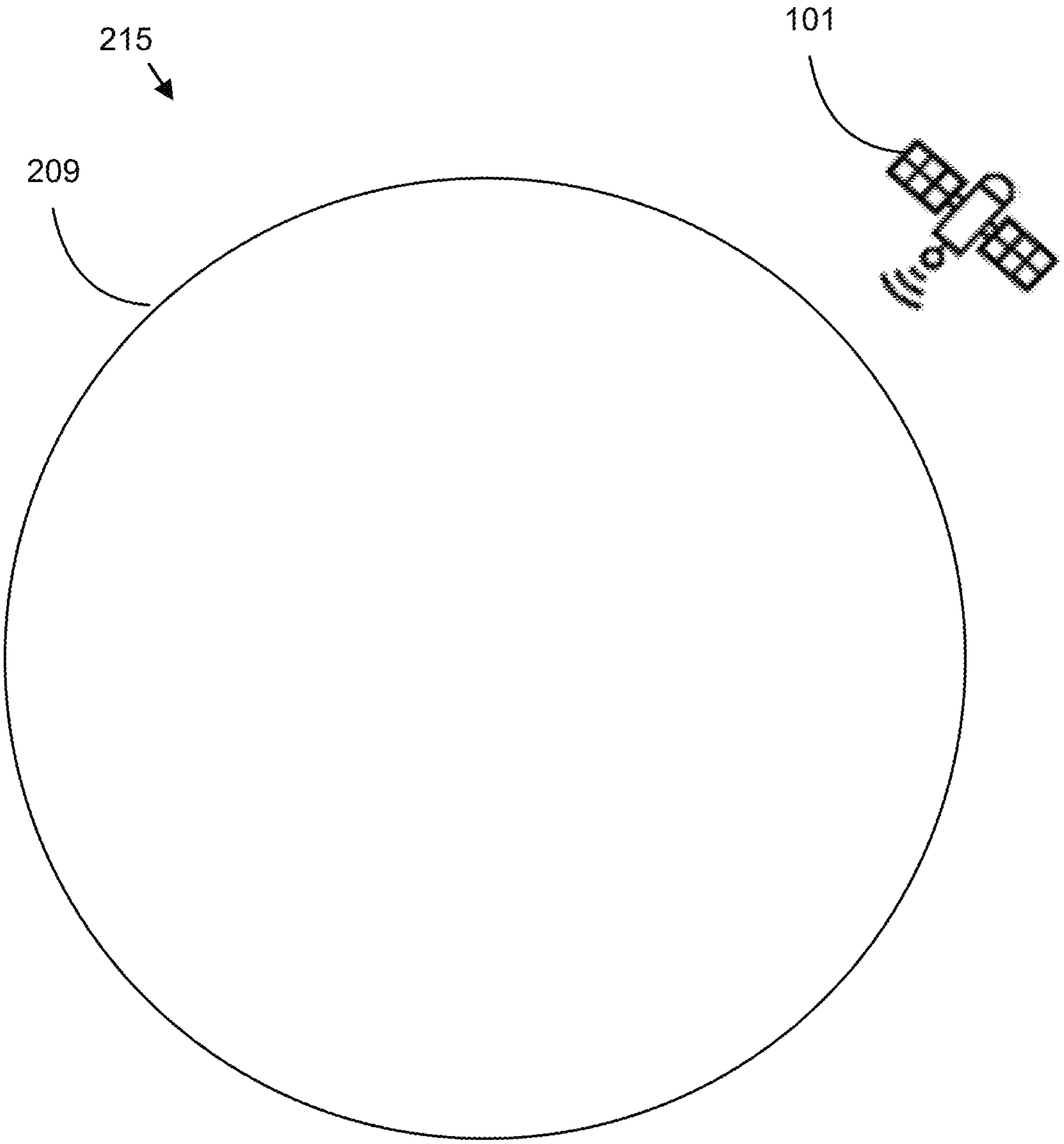
FIG. 3K is a drawing illustrating one embodiment of a maneuver strategy.

FIG. 3K is a drawing illustrating one embodiment of an optimal guidance maneuver strategy 215. In the depicted embodiment, a spacecraft 101 is shown outside an inner polytope boundary 209.

Figure 3L:
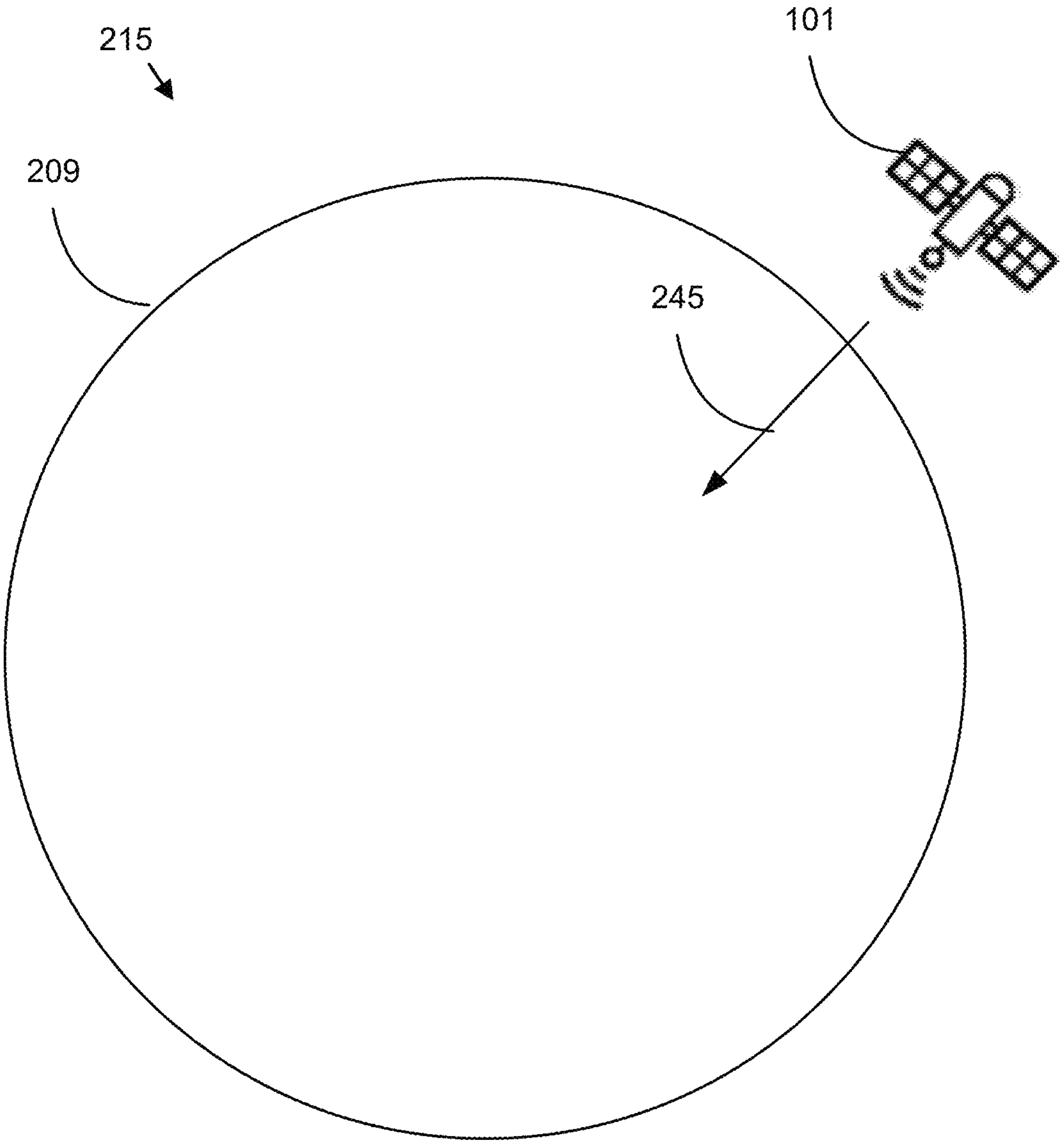
FIG. 3L is a drawing illustrating one embodiment of a maneuver strategy.

FIG. 3L is a drawing illustrating one embodiment of an optimal guidance maneuver strategy 215. In the depicted embodiment, a guidance trajectory 245 is calculated to maneuver the spacecraft 101 of FIG. 3K to within the inner polytope boundary 209 in response to detecting the spacecraft 101 outside of the inner polytope boundary 209.

Figure 3M:
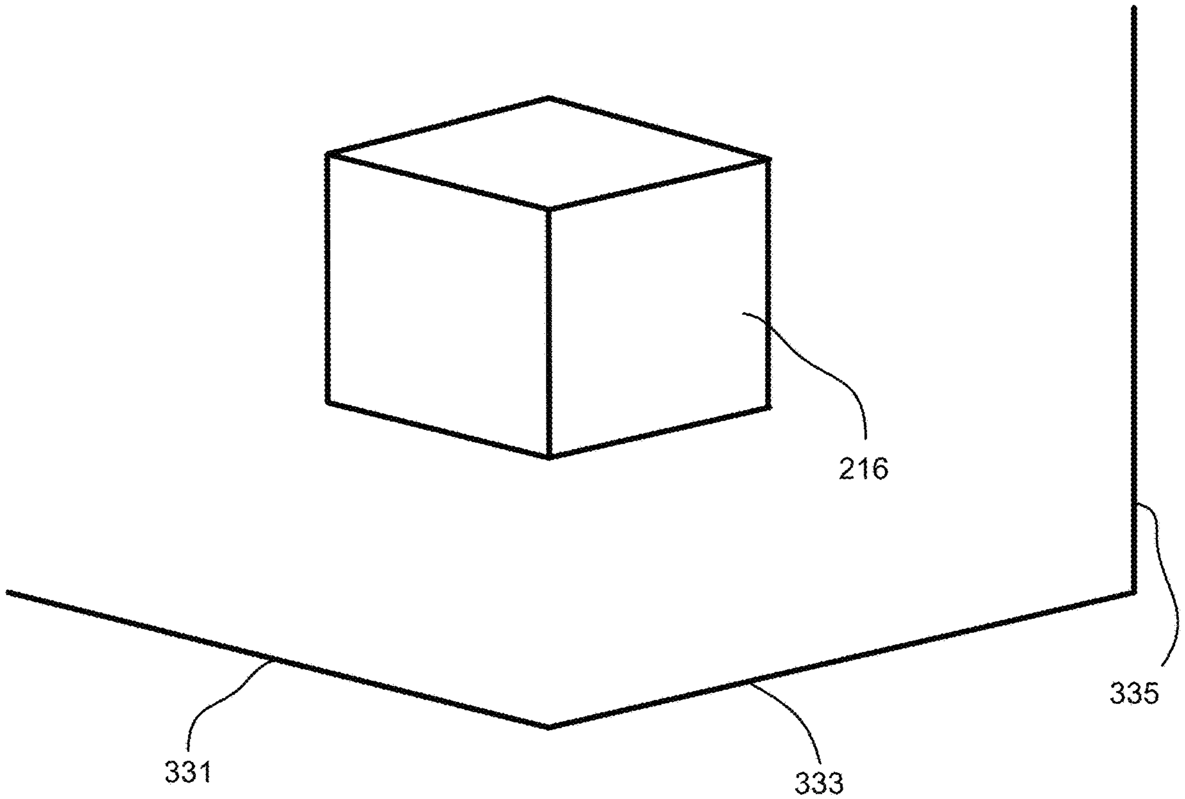
FIG. 3M is a drawing illustrating one embodiment of a boundary.

FIG. 3M is a drawing illustrating one embodiment of a boundary 216. The boundary 216 may be an ROE-based polytope. The boundary 216 is shown as a cube along the radial axis 331, the along orbital track axis 333, and the cross-orbital track axis 335. The boundary 216 may change in shape over time. In the depicted embodiment, the boundary 216 is six-sided with each side being a boundary constraint.

Figure 4:
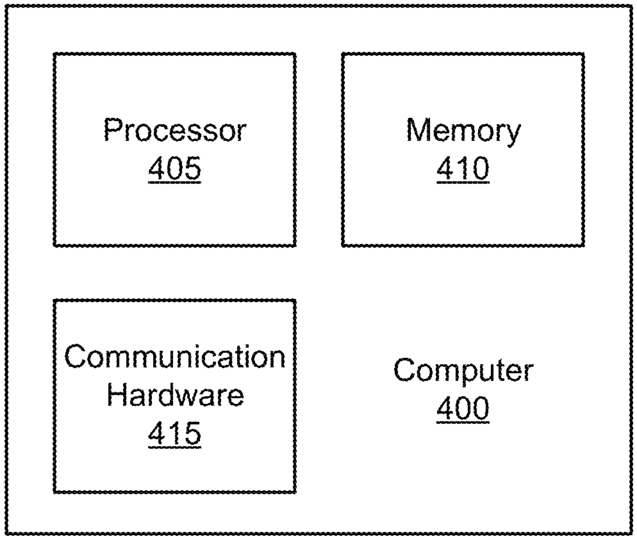
FIG. 4 is a schematic block diagram illustrating one embodiment of a computer.

FIG. 4 is a schematic block diagram illustrating one embodiment of a computer 400. The computer 400 may be embodied in a spacecraft 101 and/or ground station 103. In the depicted embodiment, the computer 400 includes a processor 405, a memory 410, and communication hardware 415. The memory 410 may store code and data. The processor 405 may execute the code and process the data. The communication hardware 415 may communicate with other devices such as spacecraft 101 and ground stations 103.

Figure 5A:
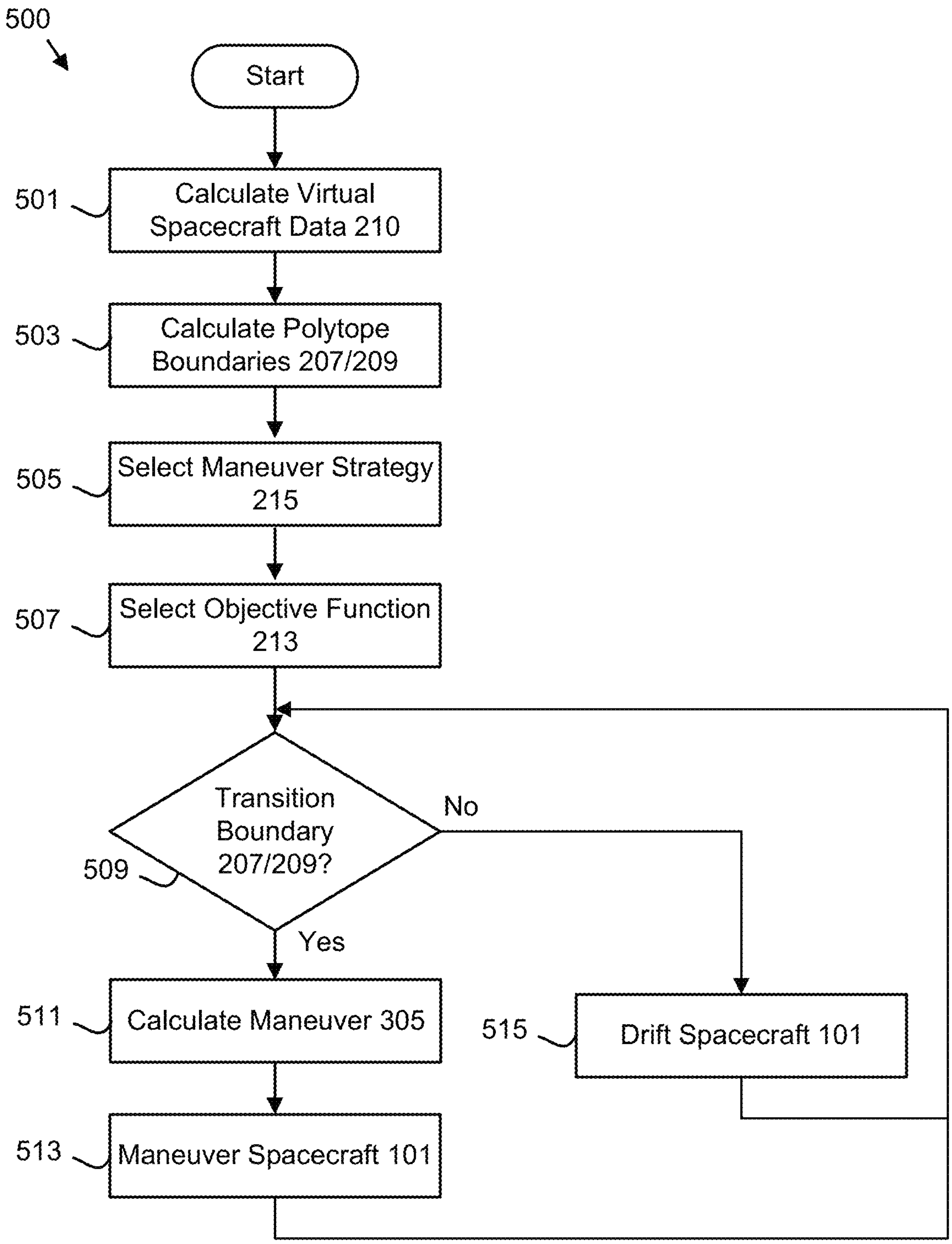
FIG. 5A is a schematic flow chart diagram illustrating one embodiment of a spacecraft control method.

FIG. 5A is a schematic flow chart diagram illustrating one embodiment of a spacecraft control method 500. The method 500 may maneuver the spacecraft 101 within a spacecraft formation 109. The method 500 may be performed by the computer 400 and/or processor 405.

The method 500 starts, and in one embodiment, the processor 405 calculates 501 the virtual spacecraft data 201 for a virtual point 111. The spacecraft data 201 may be calculated 501 from sensor data. In addition, the spacecraft data 201 may be calculated 501 from ground station data. The virtual point 111 may represent a plurality of spacecraft 101 orbiting in a spacecraft formation 109. In addition, the virtual point 111 may represent a lead spacecraft 101.

The processor 405 may calculate 503 the outer polytope boundary 207 and/or the inner polytope boundary 209 relative to the virtual point 111 for a given spacecraft 101. In addition, the processor 405 may calculate 503 the drift horizon 225. The outer polytope boundary 207 and the inner polytope boundary 209 may have a common center. The outer polytope boundary 207 and the inner polytope boundary 209 may be calculated 503 to maintain the distance threshold 205 between the given spacecraft 101 and the virtual point 111. The outer polytope boundary 207 and the inner polytope boundary 209 may be calculated 503 to maintain a vector of the distance threshold 205 between the given spacecraft 101 and the virtual point 111.

In one embodiment, the processor 405 calculates 503 only an inner polytope boundary 209. The inner polytope boundary 209 may have an inner polytope radius 313. A spacecraft 101 may be maneuvered to within the inner polytope boundary 209. The processor 405 may further calculate 503 the outer polytope boundary 207. The outer polytope boundary 209 may have an outer polytope radius 311.

The processor 405 may select 505 a maneuver strategy 215. The maneuver strategy may be an optimal guidance maneuver strategy 215. In one embodiment, the maneuver strategy 215 may be selected 505 from the group consisting of the large maneuver strategy 215 and the small maneuver strategy 215. The maneuver strategy 215 may be selected based on forecast maneuvers 305.

The processor 405 may select 507 an objective function 213. The selected objective function 213 may minimize fuel consumption. In one embodiment, the selected objective function 213 minimizes velocity change 217. In one embodiment, the $L_2$ objective function 213 is used.

In one embodiment, the processor 405 determines 509 whether the given spacecraft 101 will breach the inner polytope boundary 209. The processor 405 may determine 509 the given spacecraft 101 will exit the inner polytope boundary 209 based on the drift horizon 225. In one embodiment, the given spacecraft 101 is determined 507 to breach the inner polytope boundary 209 if the given spacecraft will exit the inner polytope boundary 209 within a specified time interval such as 5 to 60 minutes.

In one embodiment, the processor 405 determines 509 whether the given spacecraft 101 will exit the outer polytope boundary 207. The processor 405 may determine 509 the given spacecraft 101 will exit the outer polytope boundary 207 based on the drift horizon 225. The drift horizon 225 may be a specified time interval 263. In one embodiment, the given spacecraft 101 is determined 507 to exit the outer polytope boundary 207 if the given spacecraft will exit the outer polytope boundary 207 within a specified time interval such as 5 to 60 minutes. In a certain embodiment, the given spacecraft 101 is determined 507 to enter the inner polytope boundary 209 if the given spacecraft will enter the inner polytope boundary 209 within the specified time interval.

If the processor 405 determines 509 that the given spacecraft 101 will not exit the outer and/or inner polytope boundary 207/209, the processor 405 allows the given spacecraft 101 to drift 515. The processor 405 may drift 515 the spacecraft 101 by taking no action. The processor 405 will further loop to determine 509 whether the given spacecraft 101 will exit the outer polytope boundary 207.

If the processor 405 determines 509 that the given spacecraft 101 will exit the outer and/or polytope boundary 207/209, the processor 405 may calculate 511 a maneuver 305 for the given spacecraft 101 using the MPC 219. In one embodiment, the guidance trajectory 245 and/or maneuver 305 is calculated 511 using Equation 24 and/or Equation 40. The guidance trajectory 245 and/or maneuver 305 may be calculated 511 to minimize fuel consumption for the spacecraft 101. The calculation 511 may be relative to the virtual point 111. The calculation 511 of the maneuver 305 for each spacecraft 101 of the spacecraft formation 109 may be performed independently.

The processor 405 further maneuvers 513 the given spacecraft 101 to within the inner polytope boundary 209 using the MPC 219 and the method 500 ends. In one embodiment, the spacecraft 101 is maneuvered 513 within the inner polytope boundary 209 based on the switching condition 251, the guidance law 253, and/or the MPC 255. The spacecraft 101 may be maneuvered 513 subject to an objective function 213 comprising a control usage weight R, a state error weight Q, and a terminal error weight P as shown for Equation 24. In one embodiment, the guidance law 253 and/or the MPC 255 are applied to maneuvering 513 the given spacecraft 101 in response to the switching condition of a drift trajectory of the given spacecraft 101 breaching the inner polytope boundary 209. The given spacecraft 101 may be maneuvered 513 using the selected maneuver strategy 215 and/or calculated maneuver 305. The processor 405 may activate thrusters to maneuver 513 the spacecraft 101.

In one embodiment, the spacecraft 101 is maneuvered 513 to not breach an outer polytope boundary 207. In a certain embodiment, the spacecraft 101 begins maneuvering 513 after the outer polytope boundary 207 is breached and is maneuvered 513 until the spacecraft 101 is within the inner polytope boundary 209.

In one embodiment, the spacecraft 101 is maneuvered 513 in response to breaching the inner polytope boundary 209. The spacecraft 101 may be maneuvered 513 to remain within the outer polytope boundary 207. Alternatively, the spacecraft 101 may be maneuvered 513 to remain within the inner polytope boundary 209.

In one embodiment, the spacecraft 101 is maneuvered 513 in response to determining the spacecraft 101 will breach the inner polytope boundary 209. The spacecraft 101 may be maneuvered 513 to remain within the inner polytope boundary 209.

Figure 5B:
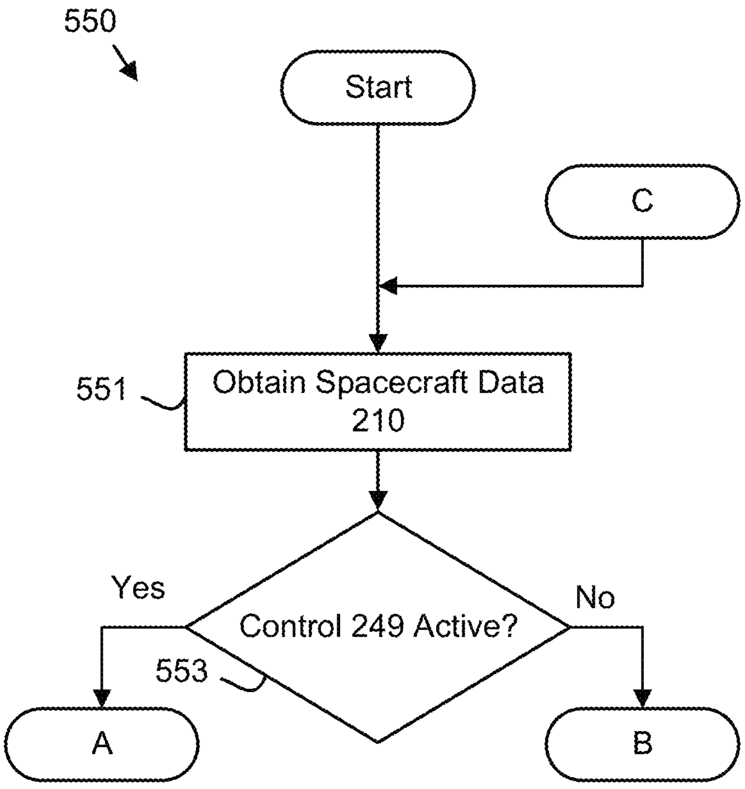
FIG. 5B-D is a schematic flow chart diagram illustrating one embodiment of a spacecraft control method.
Figure 5C:
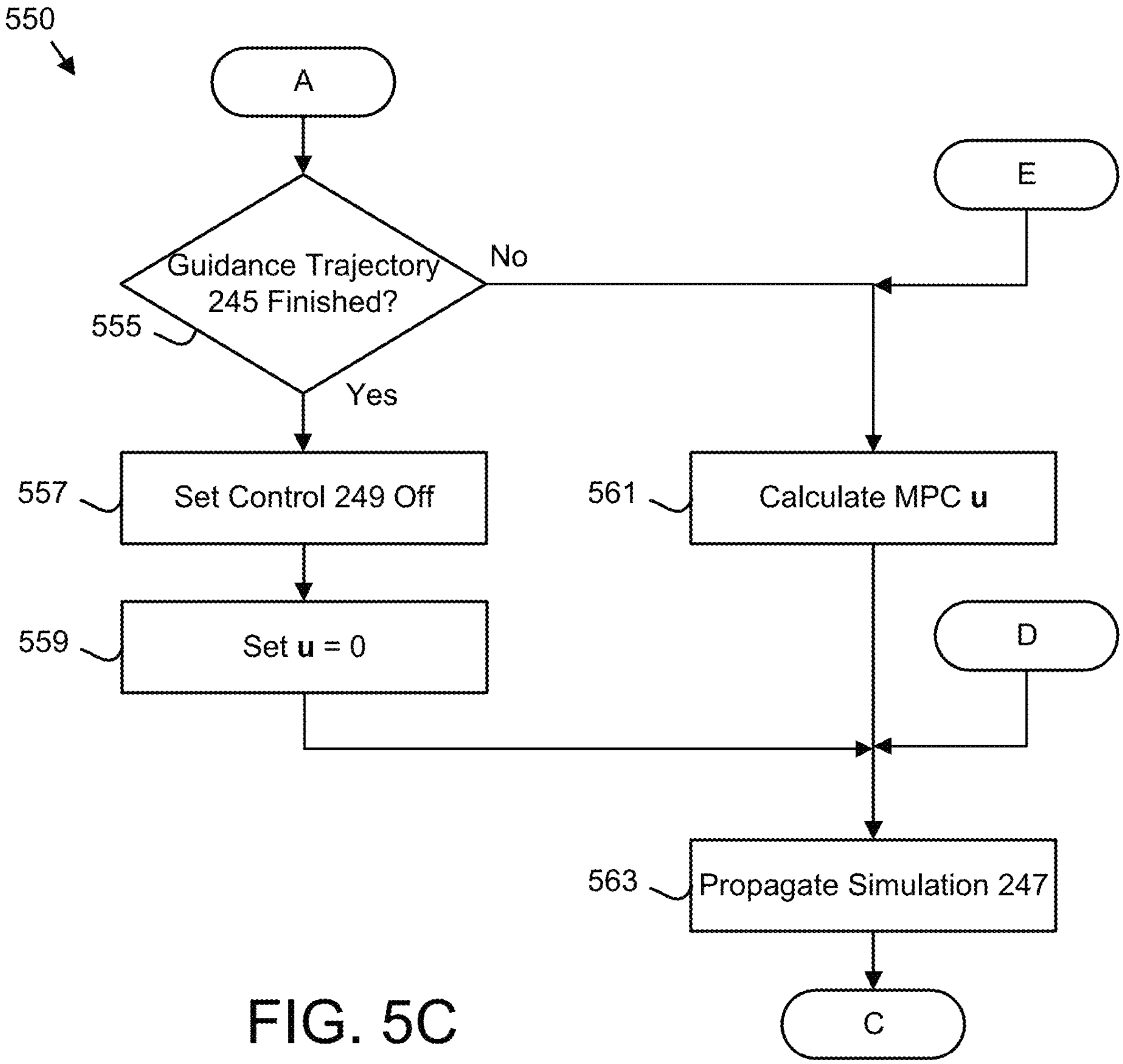
Figure 5D:
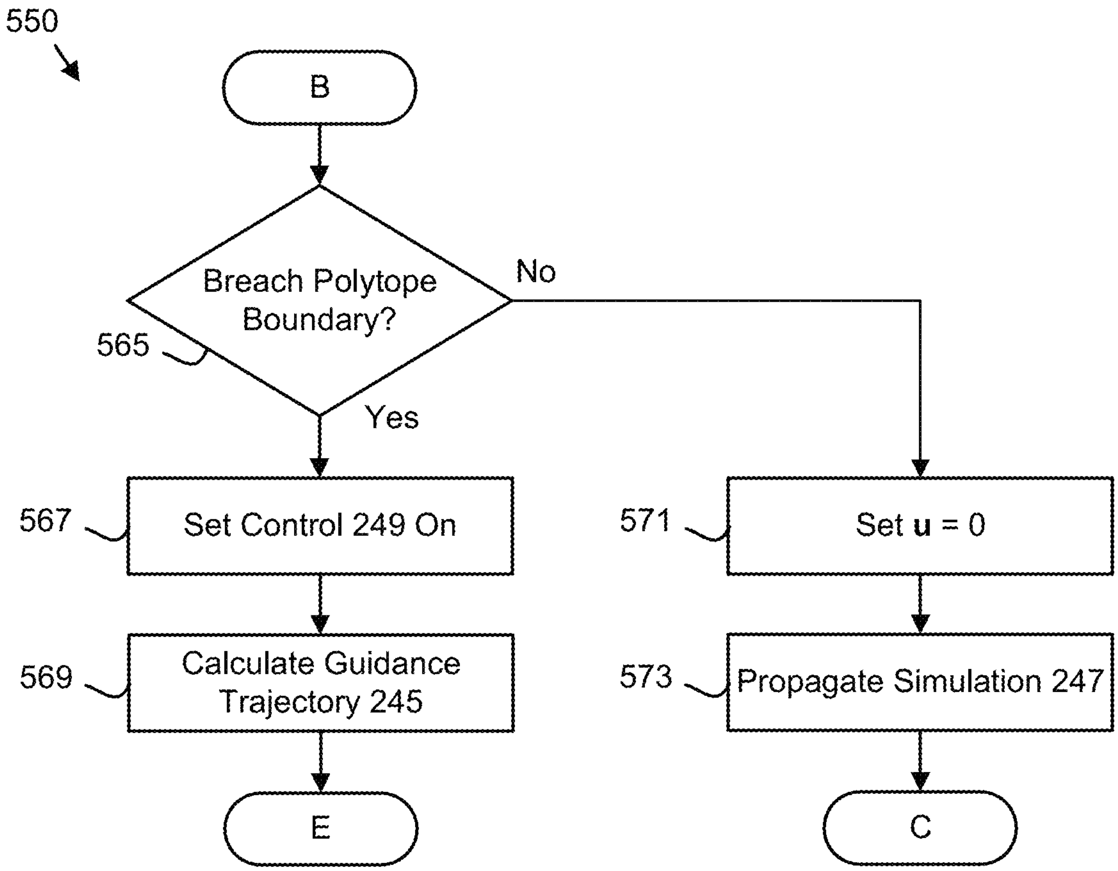

FIG. 5B-D is a schematic flow chart diagram illustrating one embodiment of a spacecraft control method 550. The method 550 may maneuver the spacecraft 101 within a spacecraft formation 109. The method 550 may be performed by the computer 400 and/or processor 405 and employ model predictive control 255 to control a spacecraft 101 and/or simulate control of a spacecraft 101.

The method 550 starts, and in one embodiment, the processor 405 obtains 551 the spacecraft data 201. The spacecraft data 201 may be obtained 551 from sensors and/or a ground station 103. Alternatively, the spacecraft data 201 may be obtained 551 from a simulation 247.

The processor 405 determines 553 whether control 249 for the spacecraft 101 is active. If control 249 is active, the processor 405 determines 555 whether a guidance trajectory 245 is finished. If the guidance trajectory 245 is finished, the processor 405 sets 557 control 249 off. In addition, the processor 405 sets 559 the MPC control vector u to zeros and propagates 563 a simulation 247 of the maneuver. If the guidance trajectory 245 is not finished, the processor 405 calculates 561 the MPC control vector u. The MPC control vector u may be calculated 561 with Equation 40. The processor 405 may propagate 563 a simulation 247 of the maneuver.

If the processor 405 determines 553 that control 249 is not active, the processor 405 determines 565 whether the spacecraft 101 has breached and/or will breach a polytope boundary 207/209. For example, the processor 405 may determine 565 whether the spacecraft 101 has breached and/or will breach the inner polytope boundary 209. Alternatively, the processor 405 may determine 565 whether the spacecraft 101 has breached and/or will breach the outer polytope boundary 207.

If the spacecraft 101 has breached the polytope boundary 207/209, the processor 405 may set 567 control 249 on. In addition, the processor 405 may calculate 569 a guidance trajectory 245. The processor 405 may further calculate 561 the MPC control vector u. The guidance trajectory 245 and/or MPC control vector u may be calculated 569 with Equation 40. The guidance trajectory 245 and/or MPC control vector u may be calculated 569 subject to an objective function 213 such as the fourth objective function **312*d* comprising the control usage weight R, the state error weight Q, and the terminal error weight P. The processor 405 may further propagate 573 a simulation 247 of the guidance trajectory 245**.

$$\min_{x_{g,k},u_{g,k}} \frac{1}{2}\sum_{k=0}^{N_g-1}\|u_{g,k}\|_{R_{g,p}} + \frac{1}{2}\|x_{e,N_g}\|_{P_{g,p}} \tag{40}$$

subject to $$x_{g,k+1} = A_D x_{g,k} + B_D u_{g,k} \quad k = 0, 1, , N_g - 1$$

$$x_{g,0} = x(0)$$

$$x_{e,k} \le x_{g,max}$$

$$x_{e,k} \ge x_{g,min}$$

$$x_{e,k} = x_{g,k} - x_{d,k} \quad k = 0, 1, , N_g$$

$$u_k \le u_{max} \quad k = 0, 1, , N_g - 1$$

$$u_k \ge -u_{max} \quad k = 0, 1, , N_g - 1$$

If the spacecraft 101 has not breached the polytope boundary 207/209, the processor 405 may set 571 the MPC control vector u to zeros and propagate 573 the simulation 247. After propagating 563/573 the method 505 loops to obtain 551 the spacecraft data 201.

Figure 6A:
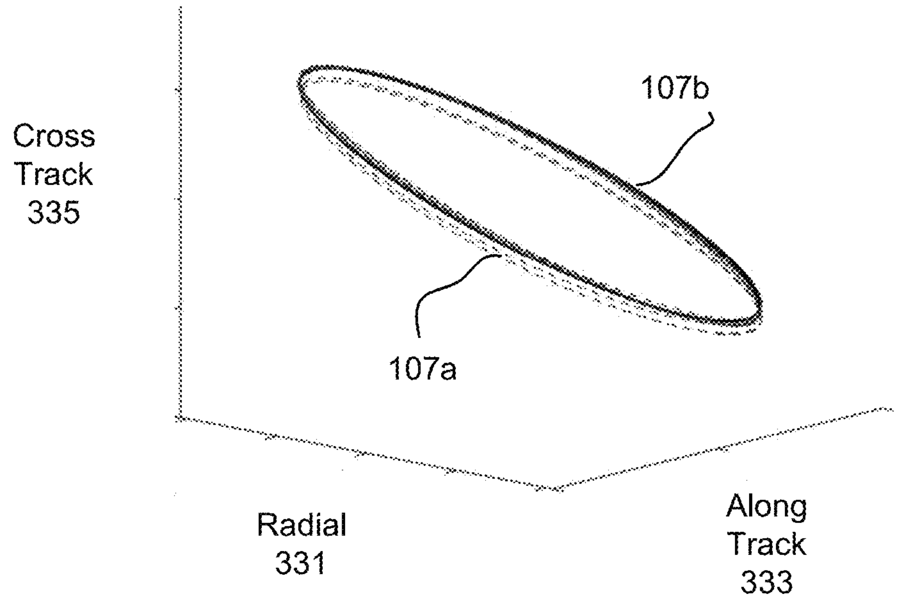
FIG. 6A is a graph illustrating one embodiment of simulated orbital paths.

FIG. 6A is a graph illustrating one embodiment of simulated orbital paths 107. Actual orbital paths (dotted) **107*a* calculated with an ROE-based polytope 208 using the method 500 of FIG. 5 and a desired orbital path (solid) 107*b* are shown in an LVLH frame. The actual orbital paths 107*a* closely approximate the desired orbital path 107*b***. The simulation is based on the parameters in Table 2.

TABLE 2

| Parameter | Value |
|---|---|
| Spacecraft Mass | 24 kilograms (kg) |
| Spacecraft $C_D$ | 2.2 |
| Spacecraft Area to Mass | 0.001 $m^2$/kg |
| Spacecraft Thrust | 0.5 Newtons |
| Simulation Timestep | 10 seconds (s) |
| Simulation Timesteps | 8640 steps |
| MPC Horizon | 60 steps |
| Drift Horizon 225 | 15 steps |

Table 3 defines the reference orbit of the virtual point 111 used in the simulation.

TABLE 3

| Keplerian Orbital Element | Value |
|---|---|
| Semi-major Axis | 6878 kilometers (km) |
| Eccentricity | $1 \times 10^{-4}$ |

TABLE 3-continued

| Keplerian Orbital Element | Value |
|---|---|
| Inclination | 25 degrees |
| Right ascension of the ascending node | 45 degrees |
| Argument of Perigee | 0 degrees |
| Initial True Anomaly | 100 degrees |

Table 4 shows the relative orbital elements used for the spacecraft 101 in the simulation.

TABLE 4

| Relative Orbital Element | Value |
|---|---|
| $\delta a$ | 0 |
| $\delta\lambda$ | 0 |
| $\delta e_x$ | $3 \times 10^{-3}$ |
| $\delta e_y$ | $3 \times 10^{-4}$ |
| $\delta i_x$ | $3 \times 10^{-4}$ |
| $\delta i_y$ | 0 |

In one embodiment, for each point along the desired orbital path 107, a volume of space is defined using the method described above. The polytope boundary $b_{bound}$ 207/209 constraint may be defined as shown in Equations 41-43.

$$A_{bound}\xi \leq b_{bound} \tag{41}$$

where $$A_{bound} = \begin{bmatrix} A_{poly,1} & 0 & & 0 & 0 & 0 \\ 0 & A_{poly,2} & & 0 & 0 & 0 \\ \vdots & \vdots & \ddots & \vdots & \vdots & \ddots & \vdots \\ 0 & 0 & & A_{poly,N} & 0 & 0 \end{bmatrix} \tag{42}$$

$$b_{bound} = \begin{bmatrix} b_{poly,1}^T & b_{poly,2}^T & b_{poly,N}^T \end{bmatrix}^T \tag{43}$$

with $A_{poly,k}$ and $b_{poly,k}$ referring to the polytope boundaries 207/209 corresponding to the kth point along the desired orbital path 107. The $A_{poly,k}$ matrix is padded with zeros to properly match whichever. While each $A_{poly,k}$ has the same number of columns, the number of rows is free to vary as long as each $A_{poly,k}$ matches its corresponding $b_{poly,k}$. This allows the polytope boundary 207/209 at each timestep k to vary with the only requirement being that the polytope is convex. The spherical polytope boundary 207/209 such as shown in FIG. 3A is fixed relative to a spacecraft's desired state but moves as the trajectory moves in the LVLH frame.

Figure 6B:
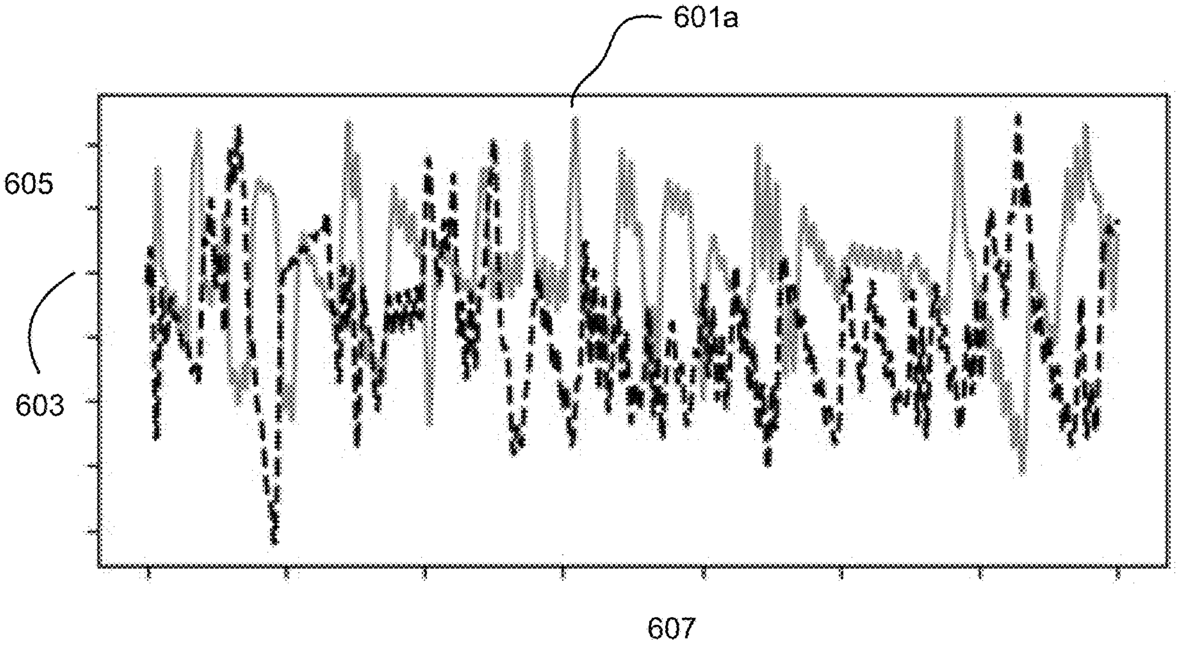
FIG. 6B is a graph illustrating one embodiment of controlled spacecraft separation distances.

FIG. 6B is a graph illustrating one embodiment of controlled spacecraft separation distances. The separation distances are simulated based on the embodiments described herein. The separation distance 601*a* between a first spacecraft 101 and a second spacecraft 101 is shown relative to a target separation distance 603 of a separation distance range 605 over time 607. In addition, the separation distance 601*b* between the first spacecraft 101 and a third spacecraft 101 is also shown. In the depicted embodiment, the depicted embodiment, each tick of the separation distance range 605 is 0.1 kilometers (km) and each tick of the time 607 is one day. As shown, the separation distances 601*a/b* remain near the target separation distance 603.

Figure 6C:
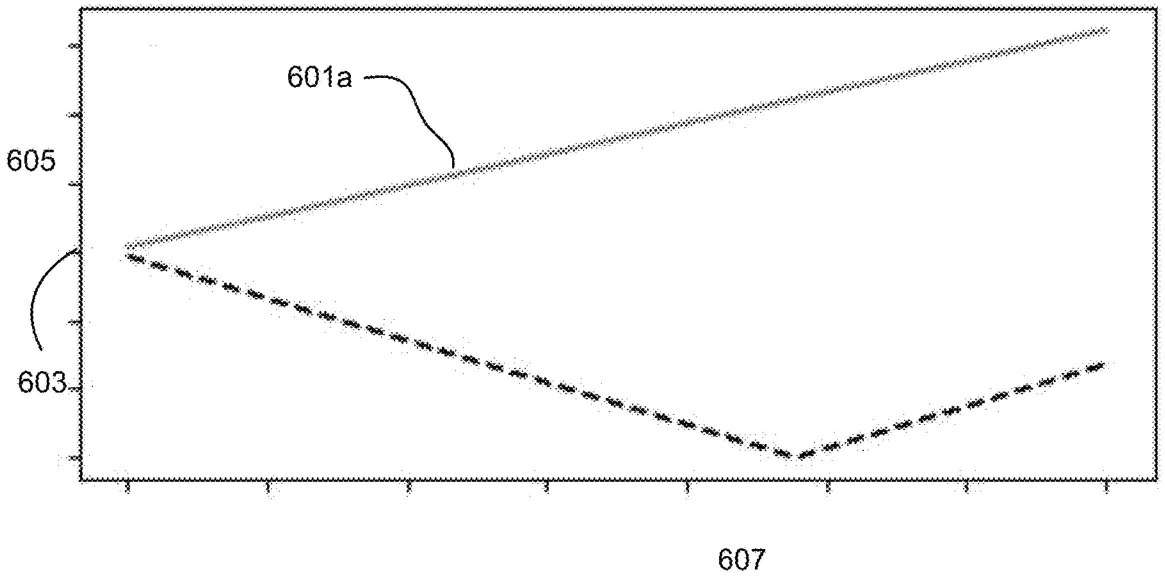
FIG. 6C is a graph illustrating one embodiment of uncontrolled spacecraft separation distances.

FIG. 6C is a graph illustrating one embodiment of uncontrolled spacecraft separation distances. The separation distance 601*a* between the first spacecraft 101 and the second spacecraft 101 of FIG. 6B is shown relative to a target separation distance 603 of a separation distance range 605 over time 607 and the separation distance 601*b* between the first spacecraft 101 and the third spacecraft 101 of FIG. 6B is also shown. In the depicted embodiment, each tick of the separation distance range 605 is 1.0 kilometers (km) and each tick of the time 607 is one day. As shown, the separation distances 601*a/b* rapidly diverges from the target separation distance 603.

The embodiments employ the virtual point 111, the outer polytope boundary 207, and the inner polytope boundary 209 to simplify calculating maneuvers 305 to maintain each spacecraft 101 at a desired position within the spacecraft formation 109. As a result, the efficiency and effectiveness of the computer 400 is improved.

Figure 7:
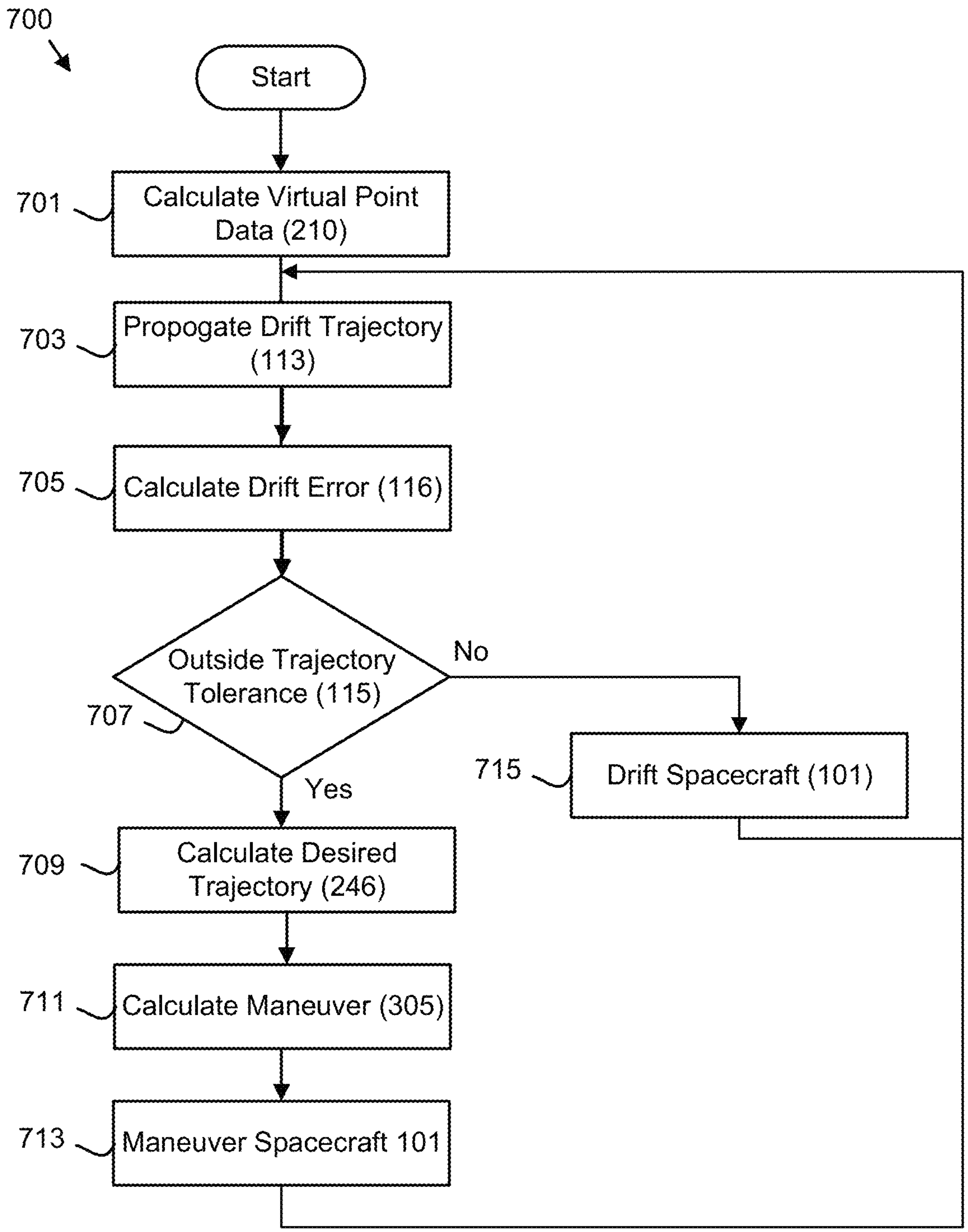
FIG. 7 is a schematic flow chart diagram illustrating one embodiment of a spacecraft control method.

FIG. 7 is a schematic flow chart diagram illustrating one embodiment of a spacecraft control method 700. The method 700 may maneuver the spacecraft 101 within a spacecraft formation 109. The method 550 may be performed by the computer 400 and/or processor 405 and employ model predictive control 255 and/or an MPC 219 to control a spacecraft 101 and/or simulate control of a spacecraft 101.

The method 700 starts and the processor 405 may calculate 701 the virtual point data 210 for the virtual point 111 in the spacecraft formation 109. The virtual point 111 may represent a plurality of spacecraft 101 orbiting in a spacecraft formation 109.

The processor 405 further propagates 703 the drift trajectory 113 for a given spacecraft 101 in the spacecraft formation 109. The given spacecraft 101 may be one of a plurality of spacecraft 101 in the spacecraft formation 109. The processor 405 may propagate 703 the drift trajectory 113 by predicting the drift trajectory 113 from ROE data 227 over at least one-time interval 263. In addition, the processor 405 may propagate 703 the drift trajectory 113 by predicting the drift trajectory 113 from ROE data 227 over at least one drift horizon 225. The processor 405 further calculates 705 the drift error 116 based on the drift trajectory 113 as shown in FIG. 1E.

The processor determines 707 whether the drift error 116 is outside the trajectory tolerance 115. In one embodiment, the processor 405 processes a set of standard orbital elements for the virtual point 111 and a second set of standard orbital elements of a given spacecraft 101 of a spacecraft formation 109, the ROE data 227, which describe the orbit of the given spacecraft 101 relative to the virtual point 111. The standard orbital elements may be determined as shown in Equation 43. In the ROE states 233, the c and d subscripts indicate the elements of the virtual point 111 and a given spacecraft 101 respectively. The orbital elements include a semi-major axis a, an eccentricity e, an inclination i, an argument of perigee ω, a right ascension of ascending node Ω, and a mean anomaly M. The dimensionless ROE states 233 may be expressed with Equations 43-45.

$$x = \begin{bmatrix} \delta a \\ \delta\lambda \\ \delta e_x \\ \delta e_y \\ \delta i_x \\ \delta i_y \end{bmatrix} = \begin{bmatrix} (a_d - a_c)/a_c \\ (f_d - f_c) + (\Omega_d - \Omega)\cos i_c \\ e_{x,d} - e_{x,c} \\ e_{y,d} - e_{y,c} \\ i_d - i_c \\ (\Omega_d - \Omega_c)\sin i_c \end{bmatrix} \tag{43}$$

$$f_c = \omega_c + M_c,\ e_{x,c} = e_c\cos\omega_c,\ e_{y,c} = e_c\sin\omega_c \tag{44}$$

$$f_d = \omega_d + M_d,\ e_{x,d} = e_d\cos\omega_d,\ e_{y,d} = e_d\sin\omega_d \tag{45}$$

The $\delta a$ term represents the relative difference in semi-major axis and the $\delta\lambda$ term gives the relative mean longitude between the two spacecraft 101. The $\delta e_x$ and $\delta e_y$ terms can be composed into a single $\delta e$ relative eccentricity vector where the magnitude gives the orbit size along the radial direction. Similarly, the $\delta i_x$ and $\delta i_y$ terms can create the $\delta i$ relative inclination vector where the magnitude defines the size of the orbit along the normal axis. The $\delta e$ and $\delta i$ vectors can additionally be used to create passively safe orbits where the agent does not pass through the relative orbital plane in front of the virtual point 111. Note that this ROE state 233 is nonsingular for circular orbits ($e_c$=0), whereas it is singular for strictly equatorial orbits ($i_c$=0).

Assuming two body motion with no perturbations, the standard orbital elements defined in Equation 46 are all constant except the mean argument of latitude, f, which increases at a constant rate, with μ representing the standard gravitation parameter.

$$\dot{f} = \frac{df}{dt} = \sqrt{\frac{\mu}{a^3}}. \tag{46}$$

Defining $\Delta f = f_d - f_c$, then $\Delta\dot{f}$ represents the drift in relative mean argument of latitude that will occur when the spacecraft 101 has a different semi-major axis than the reference orbit, and $\Delta a = a_d - a_c$. This can be approximated to the first order by the differencing of Equation 47 for the two orbits.

$$\Delta\dot{f} = \frac{d(\Delta f)}{dt} = -\frac{3}{2}\sqrt{\frac{\mu}{a^5}}\Delta a = -\frac{3}{2}n\frac{\Delta a}{a} = -\frac{3}{2}n\delta a \tag{47}$$

In one embodiment, n is the mean orbit motion and with the reasonable assumption that $\Delta f$ and $\Delta a$ are small compared to the inertial virtual point orbit radius. Assuming two body motion, the remainder of the inertial orbital elements are constant over time, and as such the other ROEs are also constant with respect to time. The full dynamics can then be represented as in Equation 48, wherein μ is a standard gravitational parameter of the Earth ($m^3/s^2$) and $n_c$ is mean motion of reference orbit (rad/s^2).

$$\dot{x} = \begin{bmatrix} 0 & 0 & 0 & 0 & 0 & 0 \\ -\frac{3n}{2} & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix} \begin{bmatrix} \delta a \\ \delta\lambda \\ \delta e_x \\ \delta e_y \\ \delta i_x \\ \delta i_y \end{bmatrix} = Ax. \tag{48}$$

If $f_M$ represents the mean argument of latitude of any given maneuver and the prefix Δ indicates the change in the specified ROE, the instantaneous changes of the ROEs ($\Delta\delta a$, $\Delta\delta\lambda$, $\Delta\delta e_x$, $\Delta\delta e_y$, $\Delta\delta i_x$, $\Delta\delta i_y$) as a result of impulsive ΔV applied along the tangential, radial, and normal axes ($\delta v_t$, $\delta v_r$, and $\delta v_n$, respectively) as shown in Equation 49.

$$\begin{aligned} \Delta\delta a &= && +\frac{2}{na}\delta v_t && \\ \Delta\delta\lambda &= -\frac{2}{na}\delta v_r && && \\ \Delta\delta e_x &= \frac{\sin f_M}{na}\delta v_r && +\frac{2\cos f_M}{na}\delta v_t && \\ \Delta\delta e_y &= -\frac{\cos f_M}{na}\delta v_r && +\frac{2\sin f_M}{na}\delta v_t && \\ \Delta\delta i_x &= && && +\frac{\cos f_M}{na}\delta v_n \\ \Delta\delta i_y &= && && +\frac{\sin f_M}{na}\delta v_n \end{aligned} \tag{49}$$

In the Relative Orbital Element State Matrix $\delta v_r$, $\delta v_t$, and $\delta v_n$ velocity changes in the Radial, Tangential, and Normal Axes with units of meters/second (m/s). These are linear, time-varying and from Equation 49 the input matrix, B, which maps impulsive $\delta v_r$, $\delta v_t$, and $\delta v_n$ velocity changes into instantaneous changes in the ROEs is shown in Equation 50.

$$B = \begin{bmatrix} 0 & \frac{2}{na} & 0 \\ -\frac{2}{na} & 0 & 0 \\ \frac{\sin f_M}{na} & \frac{2\cos f_M}{na} & 0 \\ -\frac{\cos f_M}{na} & \frac{2\sin f_M}{na} & 0 \\ 0 & 0 & \frac{\cos f_M}{na} \\ 0 & 0 & \frac{\sin f_M}{na} \end{bmatrix} \tag{50}$$

The state transition matrix for A is found as $A_D = e^{Adt}$ where dt is a timestep. The control is represented as v, with elements $\delta v_r$, $\delta v_t$, and $\delta v_n$, representing the impulsive radial, tangential, and normal velocity changes. Impulsive controls causes an instantaneous change in the ROE states 233 and is described by Equation 51, where the "–" and "+" superscripts indicates the states before and after an instantaneous velocity change, respectively.)

$$x_i^+ = x_i^- + Bv_i \tag{51}$$

Once the control 249 is applied and the ROE state 233 is propagated to the next timestep using the drifting dynamics, and the ROE state 233 is given by Equation 52.

$$x_{i+1}^- = A_D x_i^+. \tag{52}$$

Combining these so that the original ROE state 233 and the ROE state change due to the control 249 are propagated simultaneously is expressed by Equation 53.

$$x_{i+1}^- = A_D(x_i^- + Bv_i). \tag{53}$$

In one embodiment, the superscripts may dropped since everything is in terms of the measured state at each timestep before any maneuver is applied as shown in Equation 54.

$$x_{i+1} = A_D x_i + A_D B v_i. \tag{54}$$

The ROE model predictive control inputs $v_i$ rely on impulsive change in velocity (ΔV) maneuvers as the inputs, but the simulation dynamics use a zero-order hold with accelerations applied from the thruster models. However, with the dynamics being discretized with a sufficiently small time step, an impulsive ΔV can be approximated as a constant acceleration of Equation 55 at each time step.

$$v_i = a_i dt, \tag{55}$$

Thus, the acceleration limits are converted to ΔV limits based on the thruster parameters and discretization time step, the ΔV control $v_i$ at each step is solved for, and then each $v_i$ of the solution is converted to an acceleration $a_i$ to be applied to the system.

Control solutions such as model preditive control 255 and/or control laws 261 may be used within spaceflight design to find the most fuel-efficient strategy to perform a correction maneuver 305. In general, there are two main limitations that often occur when using an optimal control solution in practice. First, even with a favorable optimization formulation, a horizon time that is long enough to produce desirable convergence characteristics may prove computationally prohibitive. Second, the model of the system 100 is usually inaccurate or incomplete and the system 100 may be impacted by external disturbances that can cause it to diverge from any calculated solution.

One approach to mitigate these concerns is to implement a feedback loop using model predictive control 255 where the problem is repeatedly solved over a short time interval 263. Once a solution is obtained, the first control 249 in the solution is applied to the spacecraft 101 and then the resulting ROE state 233 is measured. The problem can then be solved again, using the new measurement as the initial condition, and the first step of the new solution is applied to the system 100. This process of repeatedly solving the problem, implementing the first step of the solution, measuring the output is called model predictive control. While model predictive control 255 generally loses any guarantee of optimality, it does provide the ability to express constraints, which is not common in many feedback control solutions. Furthermore, weights in the objective can provide intuitive "control knobs" for tuning to the desired behavior.

If the drift error 116 is outside the trajectory tolerance 115, the processor 405 may calculate 709 a desired trajectory 246. In addition, a maneuver trajectory 119 may be calculated for a maneuver 305 to achieve the desired trajectory 246. In one embodiment, the $L_1$ norm is used for model predictive control 255, but other norms such as $L_2$ and $L_\infty$ could also be used with this framework. Given an initial state of $x_0$, and a time interval 263 of N intervals, the $L_1$ objective function can be expressed by Equation 56, where R, Q, and P are the weightings on control usage, state error, and terminal error, respectively.

$$J = \Sigma_{k=1}^{N=1} \|Qx_k\|_1 + \Sigma_{k=0}^{N-1} \|Ru_k\|_1 + \|Px_N\|_1, \quad (56)$$

If the drift error 116 is not outside the trajectory tolerance 115, the processor 405 drifts 715 the spacecraft 101 and propogates 703 the drift trajectory 113. If the drift error 116 is outside the trajectory tolerance 115 of the desired trajectory 246, the processor 405 may iteratively calculate 709 a new desired trajectory 246 relative to the virtual point 111 for the spacecraft 101. The desired trajectory 246 many be calculated using the ROE state 233 of the virtual point 111 and the spacecraft 101. The model predictive control 255 may maintain the spacecraft 101 with an ROE constraint 236 for a given time interval 263 subject to fuel consumption 257.

If the drift trajectory 113 of the spacecraft 101 is outside of the trajectory tolerance 115 of the desired trajectory 246, the processor 405 may maneuver 713 the spacecraft 101 to within the trajectory tolerance 115 by using a maneuver trajectory 119 determined using the model predictive control 255.

In general, a spacecraft 101 is not able to maneuver continuously due to thruster duration constraints or mission requirements. This naturally lends itself to techniques for switched and/or hybrid control 249 where the MPC 219 changes in response to some trigger, such as a violation of the desired trajectory 246, a boundary 216, and/or a switching surface 121. For this work, a switching condition 251 is used to determine when to employ the model predictive control 255 and when to allow the satellite 101 to drift 715.

A strength of switching controllers is their simplicity. The control 249 can be as simple as switching between two states, e.g., on/off. In one embodiment, switching surfaces 121 can be leveraged as operational boundary constraints. These constraints force the ROE state 233 to stay within a designated volume defined by switching surfaces 121 which, assuming non-overlapping boundaries for each spacecraft 101, guarantees the spacecraft formation 109 stays collision free. This also allows the spacecraft 101 to drift while guaranteeing the spacecraft 101 stays within the spacecraft formation 109. This allows the spacecraft 109 to stay within the boundary 216 and be able to meet operational constraints.

In one embodiment, a control 249 based on the Model Predictive Control 255 keeps a spacecraft 101 within the trajectory tolerance 115 by using periodic course correction maneuvers. The Model Predictive Control 255 may employ the trajectory tolerance 115 and switching surface 121 to determine when maneuvers are necessary, the guidance law 253 to find a fuel optimal maneuver trajectory 119, and the guidance law 253 to follow the maneuver trajectory 119.

The processor 405 further calculates 711 a correction maneuver 305. To determine if a correction maneuver 305 is required, the spacecraft's propagated ROE state 233 may be compared to a switching condition 251 such as a switching surface 121. If the spacecraft 101 is predicted to cross the switching surface 121, then the guidance trajectory 245 plans a maneuver that will return the spacecraft 101 to a desired trajectory 246. This maneuver plan is then passed to the MPC 219 for execution, while correcting for any perturbations. Once the maneuver plan has been completed, the spacecraft 101 re-enters its drifting state and again begins propogating 703 the drift trajecting 113 and checking the propagated ROE state 233 and drift error 116 over the drift horizon 225.

In one embodiment, a correction maneuver 305 is defined as the entire period required to return the spacecraft 101 to the desired trajectory 246 and a single correction maneuver 305 may consist of several thrust events. The structure of the control 249 is described hereafter.

Since the spacecraft 101 is unable to maneuver constantly, the embodiments select the periods where the spacecraft 101 is drifting or maneuvering. The periods of drifting and/or maneuvering may be selected using the switching surface 121 that activates the MPC 219 when the spacecraft 101 is predicted to reach the switching surface 121 within some predetermined time frame, referred to as the drift horizon 225.

The switching surface 121 may be a six-sided error box in the LVLH position states 235, a cylinder, and/or an approximation of a sphere. In one embodiment, ROE constraints 236 are employed. Assuming a non-drifting relative orbit, the desired ROE state 233 and the ROE constraints 236 may be constant. Thus, there is no need to recalculate these bounds at each time step. In contrast, the LVLH states 235 move over time as the spacecraft 101 progresses along its orbit and the LVLH state constraints 238 are required to be updated at each time step. Second, the ROE constraints 236 account for the full state of the spacecraft 101. LVLH state constraints 238 in the LVLH frame account for maximum allowable positions, but generally do not account for the spacecraft's velocity vector. Since the ROE states 233 inherently reflect the dynamics of the system 100, the ROE states 233 provide a more comprehensive boundary 216 between "acceptable" and "unacceptable" orbits.

In one embodiment, the LVLH velocity limitation of the LVLH state constraints 238 may be mitigated by comparing the spacecraft's predicted propagated drift trajectory 113 against the switching surface 121. This allows the incorporation of both the spacecraft velocity and orbital dynamics into the switching strategy as both will affect the propagated drift trajectory 113. However, these methods that rely on Cartesian LVLH coordinates can only approximately compare the "closeness" of two orbits. In contrast, the use of ROE states 233 allows for direct measuring of this closeness, which entirely negates the issue.

Since the ROE states 233 do have a time-varying element (δλ), the current spacecraft state 203 is still propagated forward over some time-horizon so that corrections can be performed well before there is any immediate risk of the spacecraft 101 leaving the allowable boundaries such as the switching surfaces 121. However, by using ROE states 233, the full relative orbit can be quantified at each step and compared to the allowed boundaries and/or switching surfaces 121. In one embodiment, the ROE state 233 is employed to adjust for J2 orbital perturbations in a spherical harmonic expansion.

During the drifting phase, the spacecraft state 203 is propagated for $N_{drift}$ steps of the drift horizon 225 using the discrete form of the ROEs dynamics as shown in Equation 57, where $\hat{x}_0$ is the current state of the spacecraft.

$$\hat{x}_{k+1}=A_D\hat{x}_k\quad k=0,N_{drift}-1, \tag{57}$$

The predicted error state is then compared to the allowable boundaries 216 as $\hat{x}_k - x_{d,k} \leq x_{max}$ or $\hat{x}_k - x_{d,k} \geq x_{min}$, with element-wise comparison. If there is any step k where either of these conditions fail, then a guidance trajectory 245 is calculated and the MPC 219 is activated. The drift horizon 225 must be sufficiently long that a feasible guidance trajectory 245 can be found which satisfies the constraints such as the switching surface 121. If the drift horizon 225 is too short then by the time the switching condition 121 triggers, there may not be enough control authority to correct the spacecraft 101 before the spacecraft 101 moves out of the boundary 216. Furthermore, since a longer drift horizon 225 means the spacecraft 101 is not in any immediate danger of leaving the boundaries 216, the guidance trajectory 245 has the opportunity to delay corrections until fuel optimal points.

Once the switching condition 121 is activated and a guidance trajectory 245 is found, the processor 405 may determine 707 when the spacecraft 101 should cease maneuvering 305 and resume drifting 715. This is triggered by the spacecraft 101 fully executing the plan associated with the guidance trajectory 245, the desired trajectory 256, and/or the maneuver 305. Thus, the switching surface 121 activates the guidance trajectory 245 and control law 261 when the spacecraft 101 is anticipated to breach the allowable boundary 216 such as the switching condition 121 and deactivates it when the spacecraft 101 has finished its planned maneuver 305.

The guidance trajectory 245 is tasked with finding a fuel-optimal trajectory that takes the spacecraft 101 from the current spacecraft state 203 to the desired orbit within some specified time interval 263. When the spacecraft's flight path is predicted to leave the keep-in volume, a single guidance trajectory 245 is generated and then used by the control law 261.

The trajectory is bounded such that the nominal guidance trajectory, $x_{nom}$ 245 must be within some tolerance of the desired trajectory $x_d$ 246. Assuming a time-invariant boundary 216 and a non-drifting desired relative orbit, the boundary constraints do not need to be recalculated every time a guidance trajectory 245 is generated and can be expressed in terms of $x_{max}$ and $x_{min}$.

The desired trajectory 246 and nominal control inputs, $v_{nom}$, over $N_g$ steps of the guidance trajectory 245 are found using Equation 58, where the initial state of the guidance trajectory 245, $x_{nom,0}$, is assumed to be the current spacecraft state 203 of the spacecraft 101. Note that the control input matrix $B_k$ is time varying as a function of the mean argument of latitude although the state transition matrix is time invariant.

$$\begin{aligned}
&\min_{x_{nom},v_{nom}} && \sum\nolimits_{k=0}^{N_g-1} |v_{nom,k}|_1 && \\
&\text{s.t.} && x_{nom,k+1} = A_D x_{nom,k} + A_D B_k v_{nom,k} && k = 0, 1, , N_g - 1 \\
& && x_{nom,N_g} = x_{d,N_g} && \\
& && x_{nom,k} \leq x_{max} && k = 1, 2, , N_g \\
& && x_{nom,k} \geq x_{min} && k = 1, 2, , N_g \\
& && v_{nom,k} \leq v_{max} && k = 0, 1, 2, , N_g - 1 \\
& && v_{nom,k} \geq v_{min} && k = 0, 1, 2, , N_g - 1
\end{aligned}, \tag{58}$$

With this formulation, there is no dependence on any transient state errors ($x_{e,k}$k=1,N−1) except to ensure that the spacecraft 101 does not leave the allowable boundaries 216. However, there is a terminal constraint, $x_{nom,N_g}=x_{d,N_g}$, to ensure that the solution of the guidance trajectory 245 converges to the desired trajectory 246. This allows the guidance trajectory 245 the option to select the fuel optimal locations for orbital transfer, e.g., at apogee, perigee, or the node line. If controls 249 are applied at points besides these, successful orbital transfers are still possible but at the cost of additional fuel usage. In general, conservation of spacecraft fuel is significantly more important than convergence speed so adding the transient error and finding an appropriate weighting may increase complexity while giving minimal benefit.

The ROE constraints 236 apply a maximum allowable deviation from the desired trajectory. These ROE constraints 236 are analogous to a high-dimensional box where each state element is constrained, similar to a six-sided error boxes used to constrain position. Note that the given ROE constraints 236 constrain the full state of the system 100. This reduces the concern about a spacecraft 101 using large amounts of control if it gets "stuck" in the corner of an error box since the MPC constraint is able to account for the full state, both position and velocity, of the system 100.

The trajectory, $x_{nom}$, and control profile, $v_g$, calculated by the guidance trajectory 245 are then used by the MPC 219. While these can act as an open-loop control law 261 that drive the spacecraft 101 to the desired trajectory 246, an MPC 219 is developed that tracks this nominal trajectory and rejects perturbations.

Once the guidance trajectory 245 is found, the MPC 219 tracks which step, $n_g$, the MPC 219 is on, beginning with $n_g$=0. The MPC 219 then selects the portion of the guidance trajectory 245 to track $x_{track}$ over its $N_c$ time interval steps as shown in Equations 59 and 60.

$$x_{track,k}=x_{g,n},\quad n=n_g+k,\ k=1,N_c \tag{59}$$

$$v_{guide,k}=v_{nom,n},\quad n=n_g+k,\ k=0,N_c \tag{60}$$

In the case when $n>N_g$ and $n>N_g-1$ for the guidance trajectory 245 and control 249, respectively, these are set as shown in Equations 61 and 62, where $x_{d,0}$ is the desired spacescraft state 203 of the spacecraft 101 at the current moment.

$$x_{track,k}=x_{d,k}, k>N_g \quad (61)$$

$$v_{guide,k}=0 \quad (62)$$

The guidance trajectory 245 and associated control inputs define the long-term fuel optimal correction maneuver 305 the spacecraft 101 should follow while the MPC 219 calculates any corrections needed to keep the spacecraft 101 close to the guidance trajectory 245 in the face of perturbations which are not accounted for in the model. Since the MPC 219 is designed to reject short-term perturbations, the MPC's time horizon can be significantly shorter than the guidance trajectory time horizon which allows for decreased computation requirements.

A set of weighting parameters Q, P, and R may be used to weight the model predictive control 255 response to minimize transient state error, terminal state error, and control usage, respectfully. By weighting the state errors more than the control usage, the model predictive control 255 tends to be more aggressive in rejecting perturbations at the cost of higher control usage. In contrast, weighting the control usage higher will push the model predictive control 255 closer to an open-loop configuration where the guidance controls are followed with little change despite any deviations from the guidance trajectory. However, the boundaries 216 are still enforced, so the model predictive control 255 will still correct any deviations that would breach the boundary 216. The boundary constraints are identical to those used in both the switching surface and the guidance trajectory since the purpose is to maintain a safe spacecraft formation by enforcing the separation of the spacecraft in the formation.

The model predictive control 255 which chooses the optimal trajectory, $x_c$, and control perturbations, $v_c$, may now be formulated as shown in Equation 63.

$$\begin{aligned}
\min_{x_c, v_c} \quad & \sum_{k=0}^{N_c-1} |Rv_{c,k}|_1 + \sum_{k=1}^{N_c-1} |Qx_{e,k}|_1 + |Px_{e,N}|_1 & \\
\text{s.t.} \quad & x_{c,k+1} = A_D x_{c,k} + A_D B v_{c,k} + A_D B v_{guide,k} & k = 0, 1, , N_c - 1 \\
& x_{e,k} = x_{nom,k} - x_{track,k} & k = 1, 2, , N_c \\
& x_{c,k} \le x_{max} & k = 1, 2, , N_c \\
& x_{c,k} \ge x_{min} & k = 1, 2, , N_c \\
& v_{c,k} \le v_{max} - v_{guide,k} & k = 0, 1, 2, , N_c - 1 \\
& v_{c,k} \ge v_{min} - v_{guide,k} & k = 0, 1, 2, , N_c - 1
\end{aligned} \quad (63)$$

Once the optimal profiles have been chosen, the final combined control 249 is found as Equation 64, where v is an impulsive ΔV since the ROE model used for both the guidance trajectory and model predictive control 255 use an impulsive ΔV as the inputs.

$$v=v_{guide,0}+v_{c,0}, \quad (64)$$

However, it is assumed that the input to the system 100 is acceleration. Over a short time, dt, a constant acceleration, u, that approximates the impulsive v can be found by Equation 65, which can then be applied to the spacecraft simulation.

$$u=\frac{v}{dt}, \quad (65)$$

The processor 405 maneuvers 713 the spacecraft 101. The spacecraft 101 may be maneuvered not to breach a boundary 216. In one embodiment, the spacecraft 101 is maneuvered to adjust for orbital perturbations. The orbital perturbations may be J2, J3, J4 and the like terms in a spherical harmonic expansion.

In one embodiment, the MPC 219 runs once at each time step to find the optimal input. This input is then applied to the spacecraft 101. The resulting spacecraft state 203 is then used to update the initial state of the MPC 219. This method 700 continues until the final step of the guidance trajectory 245 has been completed, the drift error 116 is not outside the trajectory tolerance, and the spacecraft 101 drifts 715.

Figure 8:
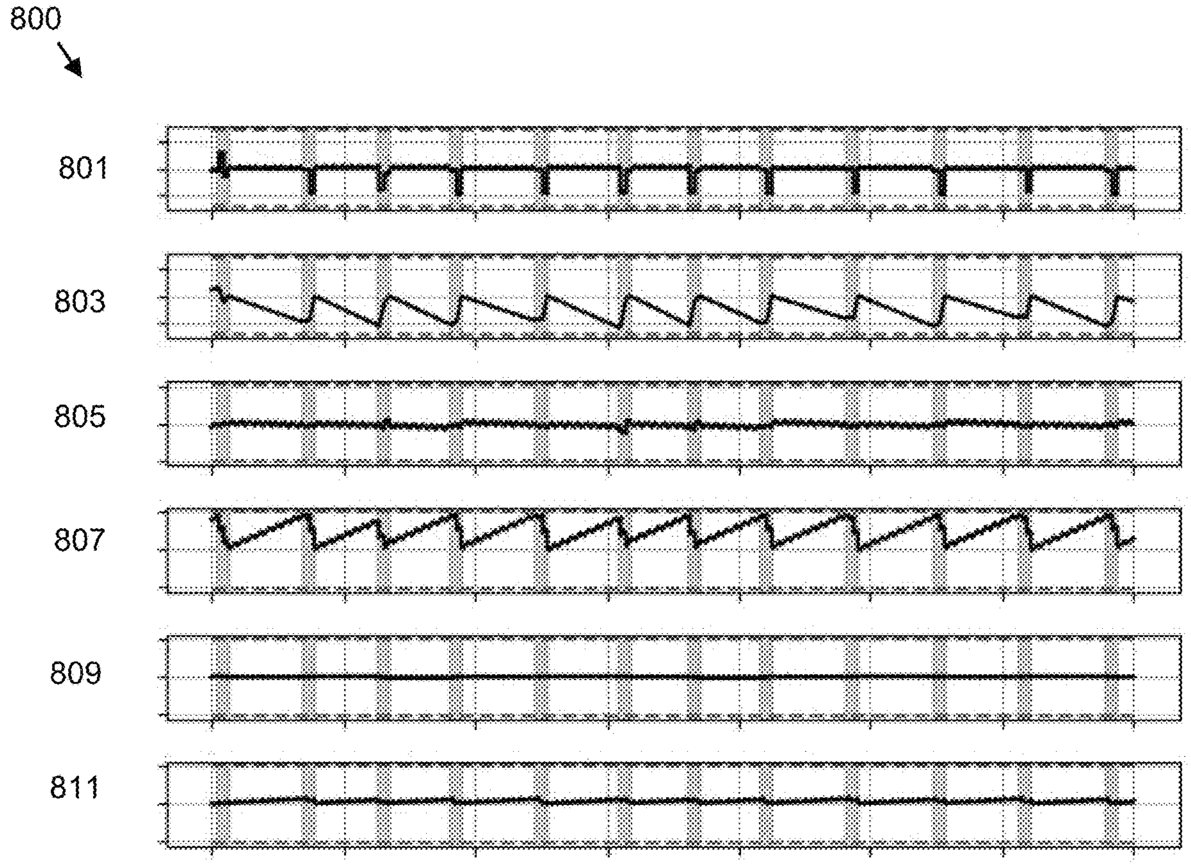
FIG. 8 is a graph illustrating one embodiment of error states.

FIG. 8 is a graph 800 illustrating one embodiment of ROE error states. In the depicted graph, the semi-major axis error 801, the eccentricity error 803, the inclination error 805, the argument of perigee error 807, the right ascension of ascending node error, 809, and mean anomaly error 811 are shown for a simulated correction maneuver 305.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:

calculating, by use of a processor, a virtual point that represents a plurality of spacecraft orbiting in a spacecraft formation;

iteratively calculating a desired trajectory relative to the virtual point for a given spacecraft of the plurality of spacecraft using a relative orbital elements (ROE) state x of the virtual point and the given spacecraft, wherein model predictive control maintains the given spacecraft within an ROE constraint for a given time interval subject to a fuel consumption; and in response to determining a drift trajectory of the given spacecraft is outside of a trajectory tolerance of the desired trajectory, maneuvering the given spacecraft to within the trajectory tolerance using a maneuver trajectory determined using the model predictive control.

2. The method of claim 1, wherein the ROE state x is calculated as $$x = \begin{bmatrix} \delta a \\ \delta\lambda \\ \delta e_x \\ \delta e_y \\ \delta i_x \\ \delta i_y \end{bmatrix} = \begin{bmatrix} (a_d - a_c)/a_c \\ (f_d - f_c) + (\Omega_d - \Omega)\cos i_c \\ e_{x,d} - e_{x,c} \\ e_{y,d} - e_{y,c} \\ i_d - i_c \\ (\Omega_d - \Omega_c)\sin i_c \end{bmatrix},$$

wherein d refers to the given spacecraft, c refers to the virtual point, a is a semi-major axis, e is an eccentricity, i is an inclination, ω is an argument of perigee, Ω is a right ascension of ascending node, and M is a mean anomaly.

3. The method of claim 2, wherein the guidance trajectory $x_{nom,k}$ is found by minimizing an equation $$\begin{array}{lll} \min_{x_{nom},v_{nom}} & \sum_{k=0}^{N_g-1}|v_{nom,k}|_1 & \\ \text{s.t.} & x_{nom,k+1} = A_D x_{nom,k} + A_D B_k v_{nom,k} & k = 0, 1, , N_g - 1 \\ & x_{nom,N_g} = x_{d,N_g} & \\ & x_{nom,k} \leq x_{max} & k = 1, 2, , N_g \\ & x_{nom,k} \geq x_{min} & k = 1, 2, , N_g \\ & v_{nom,k} \leq v_{max} & k = 0, 1, 2, , N_g - 1 \\ & v_{nom,k} \geq v_{min} & k = 0, 1, 2, , N_g - 1 \end{array},$$

wherein $A_D$ is a state transition matrix, B is an input matrix.

4. The method of claim 3, wherein the model predictive control calculates a maneuver trajectory as $$\begin{array}{lll} \min_{x_c,v_c} & \sum_{k=0}^{N_c-1}|Rv_{c,k}|_1 + \sum_{k=1}^{N_c-1}\left|Qx_{e,k}\right|_1 + |Px_{e,N}|_1 & \\ \text{s.t.} & x_{c,k+1} = A_D x_{c,k} + A_D B v_{c,k} + A_D B v_{guide,k} & k = 0, 1, , N_c - 1 \\ & x_{e,k} = x_{nom,k} - x_{track,k} & k = 1, 2, , N_c \\ & x_{c,k} \leq x_{max} & k = 1, 2, , N_c \\ & x_{c,k} \geq x_{min} & k = 1, 2, , N_c \\ & v_{c,k} \leq v_{max} - v_{guide,k} & k = 0, 1, 2, , N_c - 1 \\ & v_{c,k} \geq v_{min} - v_{guide,k} & k = 0, 1, 2, , N_c - 1 \end{array},$$

wherein a velocity v for a step is calculated as $v=v_{nom,mpc\_step-1}+v_0$.

5. The method of claim 1, wherein the ROE state adjusts for J2 orbital perturbations.

6. The method of claim 1, wherein the given spacecraft is further maneuvered not to breach a boundary.

7. The method of claim 6, wherein the boundary is six-sided.

8. An apparatus comprising:

a processor executing code stored on a memory to perform:

calculating, by use of a processor, a virtual point that represents a plurality of spacecraft orbiting in a spacecraft formation;

iteratively calculating a desired trajectory relative to the virtual point for a given spacecraft of the plurality of spacecraft using a relative orbital elements (ROE) state x of the virtual point and the given spacecraft, wherein model predictive control maintains the given spacecraft within an ROE constraint for a given time interval subject to a fuel consumption; and in response to determining a drift trajectory of the given spacecraft is outside of a trajectory tolerance of the desired trajectory, maneuvering the given spacecraft to within the trajectory tolerance using a maneuver trajectory determined using the model predictive control.

9. The apparatus of claim 8, wherein the ROE state x is calculated as $$x = \begin{bmatrix} \delta a \\ \delta\lambda \\ \delta e_x \\ \delta e_y \\ \delta i_x \\ \delta i_y \end{bmatrix} = \begin{bmatrix} (a_d - a_c)/a_c \\ (f_d - f_c) + (\Omega_d - \Omega)\cos i_c \\ e_{x,d} - e_{x,c} \\ e_{y,d} - e_{y,c} \\ i_d - i_c \\ (\Omega_d - \Omega_c)\sin i_c \end{bmatrix},$$

wherein d refers to the given spacecraft, c refers to the virtual point, a is a semi-major axis, e is an eccentricity, i is an inclination, ω is an argument of perigee, Ω is a right ascension of ascending node, and M is a mean anomaly.

10. The apparatus of claim 9, wherein the guidance trajectory $x_{nom,k}$ is found by minimizing an equation $$\begin{array}{lll} \min_{x_{nom},v_{nom}} & \sum_{k=0}^{N_g-1}|v_{nom,k}|_1 & \\ \text{s.t.} & x_{nom,k+1} = A_D x_{nom,k} + A_D B_k v_{nom,k} & k = 0, 1, , N_g - 1 \\ & x_{nom,N_g} = x_{d,N_g} & \\ & x_{nom,k} \leq x_{max} & k = 1, 2, , N_g \\ & x_{nom,k} \geq x_{min} & k = 1, 2, , N_g \\ & v_{nom,k} \leq v_{max} & k = 0, 1, 2, , N_g - 1 \\ & v_{nom,k} \geq v_{min} & k = 0, 1, 2, , N_g - 1 \end{array},$$

wherein $A_D$ is a state transition matrix, B is an input matrix.

11. The apparatus of claim 9, wherein the model predictive control calculates a maneuver trajectory as $$\begin{array}{lll} \min_{x_c,v_c} & \sum_{k=0}^{N_c-1}|Rv_{c,k}|_1 + \sum_{k=1}^{N_c-1}\left|Qx_{e,k}\right|_1 + |Px_{e,N}|_1 & \\ \text{s.t.} & x_{c,k+1} = A_D x_{c,k} + A_D B v_{c,k} + A_D B v_{guide,k} & k = 0, 1, , N_c - 1 \\ & x_{e,k} = x_{nom,k} - x_{track,k} & k = 1, 2, , N_c \\ & x_{c,k} \leq x_{max} & k = 1, 2, , N_c \\ & x_{c,k} \geq x_{min} & k = 1, 2, , N_c \\ & v_{c,k} \leq v_{max} - v_{guide,k} & k = 0, 1, 2, , N_c - 1 \\ & v_{c,k} \geq v_{min} - v_{guide,k} & k = 0, 1, 2, , N_c - 1 \end{array},$$

wherein a velocity v for a step is calculated as $v=v_{nom,mpc\_step-1}+v_0$.

12. The apparatus of claim 8, wherein the ROE state adjusts for perturbations.

13. The apparatus of claim 8, wherein the given spacecraft is further maneuvered not to breach a boundary.

14. The apparatus of claim 13, wherein the boundary is six-sided.

15. A computer program product comprising a computer readable storage medium storing code executed by a processor to perform:

calculating, by use of a processor, a virtual point that represents a plurality of spacecraft orbiting in a spacecraft formation;

iteratively calculating a desired trajectory relative to the virtual point for a given spacecraft of the plurality of spacecraft using a relative orbital elements (ROE) state x of the virtual point and the given spacecraft, wherein model predictive control maintains the given spacecraft within an ROE constraint for a given time interval subject to a fuel consumption; and in response to determining a drift trajectory of the given spacecraft is outside of a trajectory tolerance of the desired trajectory, maneuvering the given spacecraft to within the trajectory tolerance using a maneuver trajectory determined using the model predictive control.

16. The computer program product of claim 15, wherein the ROE state x is calculated as $$x = \begin{bmatrix} \delta a \\ \delta\lambda \\ \delta e_x \\ \delta e_y \\ \delta i_x \\ \delta i_y \end{bmatrix} = \begin{bmatrix} (a_d - a_c)/a_c \\ (f_d - f_c) + (\Omega_d - \Omega)\cos i_c \\ e_{x,d} - e_{x,c} \\ e_{y,d} - e_{y,c} \\ i_d - i_c \\ (\Omega_d - \Omega_c)\sin i_c \end{bmatrix},$$

wherein d refers to the given spacecraft, c refers to the virtual point, a is a semi-major axis, e is an eccentricity, i is an inclination, ω is an argument of perigee, Ω is a right ascension of ascending node, and M is a mean anomaly.

17. The computer program product of claim 16, wherein the guidance trajectory $x_{nom,k}$ is found by minimizing an equation $$\begin{aligned} \min_{x_{nom}, v_{nom}} \quad & \sum_{k=0}^{N_g-1} |v_{nom,k}|_1 & \\ \text{s.t.} \quad & x_{nom,k+1} = A_D x_{nom,k} + A_D B_k v_{nom,k} & k = 0, 1, , N_g - 1 \\ & x_{nom,N_g} = x_{d,N_g} & \\ & x_{nom,k} \leq x_{max} & k = 1, 2, , N_g \\ & x_{nom,k} \geq x_{min} & k = 1, 2, , N_g \\ & v_{nom,k} \leq v_{max} & k = 0, 1, 2, , N_g - 1 \\ & v_{nom,k} \geq v_{min} & k = 0, 1, 2, , N_g - 1 \end{aligned},$$

wherein $A_D$ is a state transition matrix, B is an input matrix.

18. The computer program product of claim 17, wherein the model predictive control calculates a maneuver trajectory as $$\begin{aligned} \min_{x_c, v_c} \quad & \sum_{k=0}^{N_c-1} |Rv_{c,k}|_1 + \sum_{k=1}^{N_c-1} |Qx_{e,k}|_1 + |Px_{e,N}|_1 & \\ \text{s.t.} \quad & x_{c,k+1} = A_D x_{c,k} + A_D B v_{c,k} + A_D B v_{guide,k} & k = 0, 1, , N_c - 1 \\ & x_{e,k} = x_{nom,k} - x_{track,k} & k = 1, 2, , N_c \\ & x_{c,k} \leq x_{max} & k = 1, 2, , N_c \\ & x_{c,k} \geq x_{min} & k = 1, 2, , N_c \\ & v_{c,k} \leq v_{max} - v_{guide,k} & k = 0, 1, 2, , N_c - 1 \\ & v_{c,k} \geq v_{min} - v_{guide,k} & k = 0, 1, 2, , N_c - 1 \end{aligned},$$

wherein a velocity v for a step is calculated as $v = v_{nom,mpc\_step-1} + v_0$.

19. The computer program product of claim 15, wherein the ROE state adjusts for orbital perturbations.

20. The computer program product of claim 15, wherein the given spacecraft is further maneuvered not to breach a boundary.

* * * * *